US008908571B2

(12) United States Patent
Hart et al.

(10) Patent No.: US 8,908,571 B2
(45) Date of Patent: *Dec. 9, 2014

(54) ENABLING COEXISTENCE BETWEEN WIRELESS NETWORKS

(75) Inventors: Michael Hart, Seattle, WA (US); Yang Xu, Redmond, WA (US); Peter Gelbman, Kirkland, WA (US); Herkole Sava, Fairfax, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 597 days.

This patent is subject to a terminal disclaimer.

(21) Appl. No.: 13/160,273

(22) Filed: Jun. 14, 2011

(65) Prior Publication Data

US 2012/0082070 A1 Apr. 5, 2012

Related U.S. Application Data

(63) Continuation-in-part of application No. 12/896,494, filed on Oct. 1, 2010, now Pat. No. 8,681,660.

(51) Int. Cl.
| H04J 3/00 | (2006.01) |
| H04L 1/00 | (2006.01) |
| H04J 11/00 | (2006.01) |
| H04W 52/36 | (2009.01) |

(52) U.S. Cl.
CPC ........... *H04J 11/0023* (2013.01); *H04L 1/0028* (2013.01); *H04W 52/367* (2013.01); *H04L 1/0001* (2013.01); *H04L 1/0035* (2013.01); *H04L 1/0026* (2013.01)
USPC ....................................................... 370/280

(58) Field of Classification Search
CPC ................................. H04W 52/367
USPC .................................. 370/280, 329, 336, 350
See application file for complete search history.

(56) References Cited

U.S. PATENT DOCUMENTS

| 8,264,978 | B1 | 9/2012 | Srinivas et al. | 370/252 |
| 2003/0017830 | A1 | 1/2003 | Kayama et al. | 455/450 |
| 2007/0286156 | A1 | 12/2007 | Gormley et al. | 370/350 |
| 2008/0316947 | A1* | 12/2008 | Lindoff et al. | 370/294 |
| 2009/0163199 | A1 | 6/2009 | Kazmi et al. | 455/425 |
| 2009/0201867 | A1 | 8/2009 | Teo et al. | 370/329 |

(Continued)

FOREIGN PATENT DOCUMENTS

| EP | 1 229 671 A2 | 8/2002 |
| GB | 2 376 606 | 12/2002 |

(Continued)

*Primary Examiner* — Jeffrey M Rutkowski
*Assistant Examiner* — Peter Mak

(57) ABSTRACT

Systems and methods for detecting and mitigating interference between from a first wireless time division duplex (TDD) communications device and a second wireless TDD communications device includes processing quality-indicator reports received from the first TDD device to determine if reception at the first TDD device has experienced interference from the second TDD device. Such interference at the first TDD device may indicate that the first TDD device may also cause interference to reception at the second TDD device. Accordingly, to mitigate the possible interference from the first TDD device, an uplink configuration of the first TDD base station may be adjusted. The adjustment of the uplink configuration may include configuring reception of data packets at the first TDD base station from the first TDD device in accordance with an interference-free time interval, an unprotected time interval, or a specific portion of an associated frequency band.

28 Claims, 9 Drawing Sheets

(56) References Cited

U.S. PATENT DOCUMENTS

| | | | |
|---|---|---|---|
| 2009/0264142 A1* | 10/2009 | Sankar et al. | 455/501 |
| 2010/0002608 A1* | 1/2010 | Goldhamer | 370/280 |
| 2010/0110878 A1 | 5/2010 | Frederiksen et al. | 370/216 |
| 2010/0135272 A1 | 6/2010 | Dayal et al. | |
| 2010/0195507 A1 | 8/2010 | Marinier et al. | 370/242 |
| 2010/0202369 A1* | 8/2010 | Pedersen et al. | 370/329 |
| 2010/0220597 A1 | 9/2010 | Ji et al. | |
| 2010/0227622 A1 | 9/2010 | Mody et al. | |
| 2010/0254483 A1 | 10/2010 | Chun et al. | 375/295 |
| 2011/0228712 A1 | 9/2011 | Anderson | 370/280 |
| 2012/0082038 A1 | 4/2012 | Xu et al. | 370/244 |
| 2012/0134275 A1* | 5/2012 | Choi et al. | 370/241 |
| 2013/0170360 A1 | 7/2013 | Xu et al. | 370/241 |
| 2013/0176997 A1* | 7/2013 | Tian et al. | 370/336 |

FOREIGN PATENT DOCUMENTS

| | | |
|---|---|---|
| WO | WO 2005/101888 | 10/2005 |
| WO | WO 2008/039856 | 4/2008 |
| WO | WO 2010/057008 | 5/2010 |
| WO | WO 2010/077192 | 7/2010 |
| WO | WO 2010/099485 | 9/2010 |

\* cited by examiner

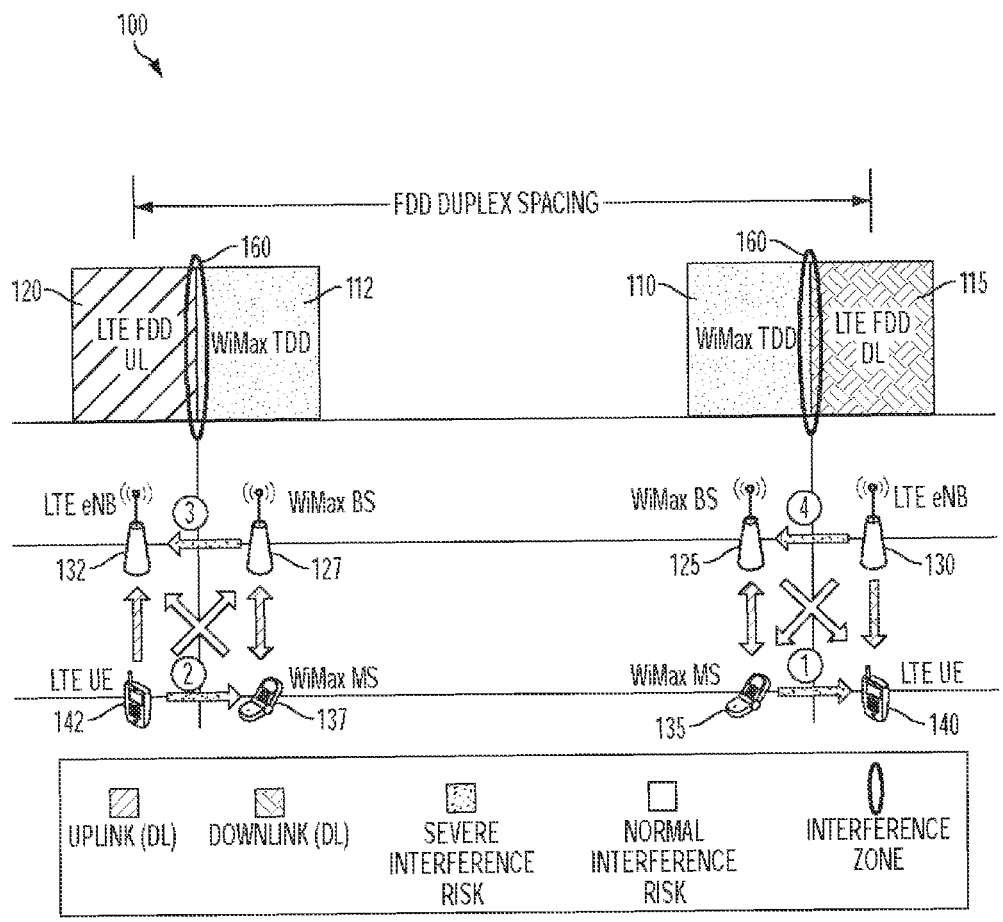
FIG. 1
(CONVENTIONAL)

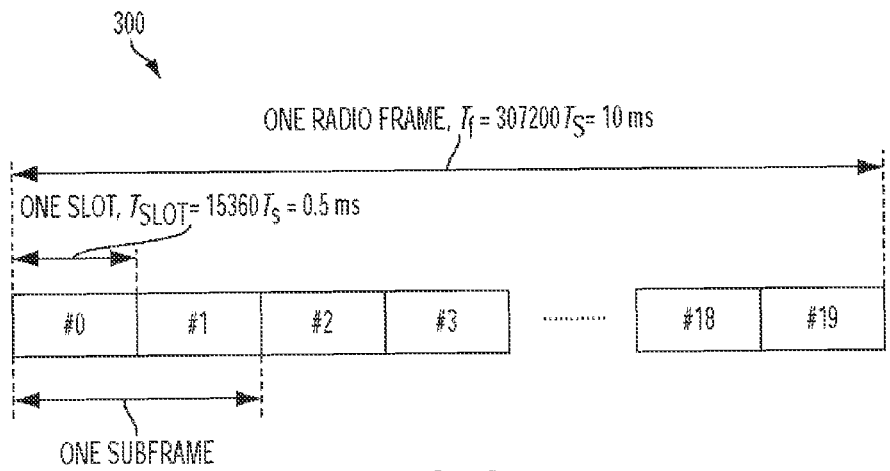
FIG. 3
(CONVENTIONAL)

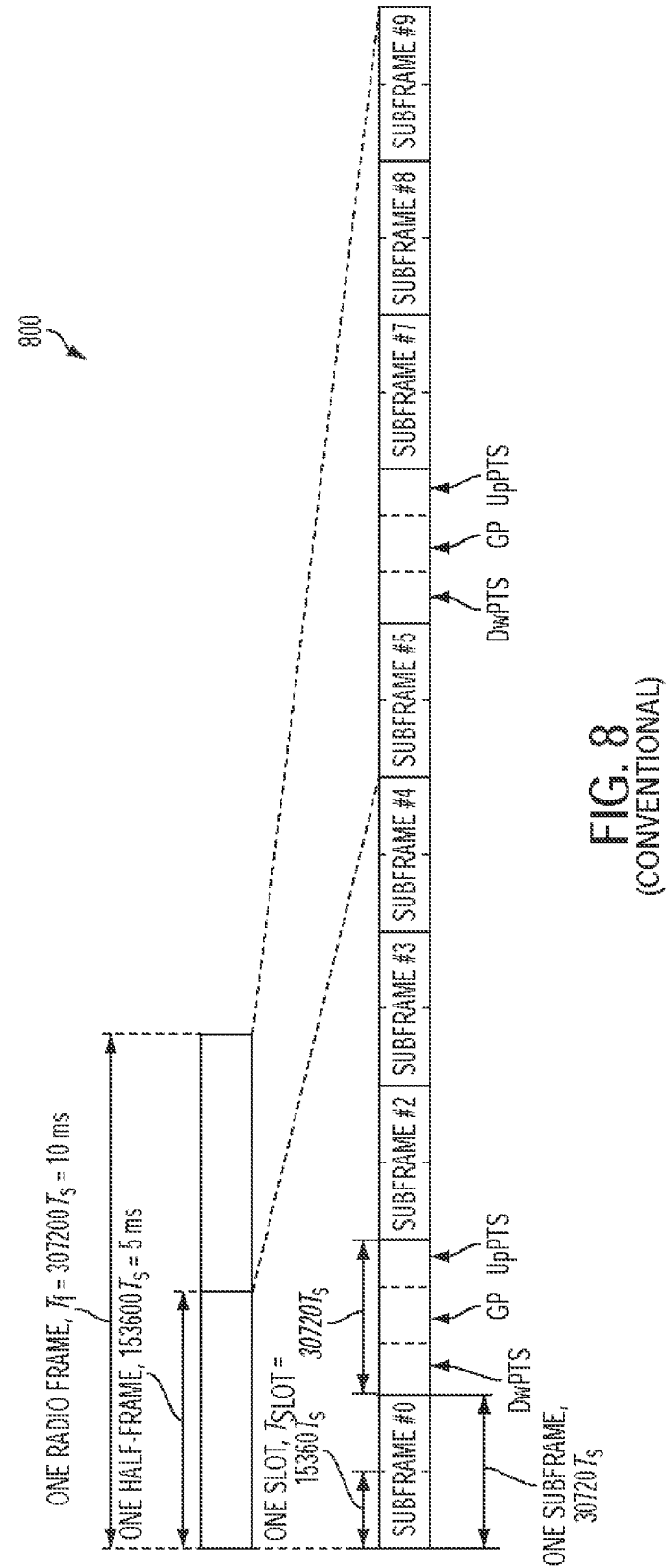
FIG. 8
(CONVENTIONAL)

ENABLING COEXISTENCE BETWEEN WIRELESS NETWORKS

CROSS-REFERENCE TO RELATED APPLICATIONS

This application is a continuation-in-part (CIP) application under 35 U.S.C §120 of co-pending U.S. patent application Ser. No. 12/896,494, filed on Oct. 1, 2010, the entire contents of which are incorporated herein by reference.

BACKGROUND

This disclosure is generally related to high speed wireless packet-based networks and devices. In particular, this disclosure is related to interference between devices operating in a time division duplex (TDD) network and a frequency division duplex (FDD) network, or interference between devices operating in different TDD networks. Examples of TDD and FDD networks include networks operating on wireless technologies such as Worldwide Interoperability for Microwave Access ("WiMAX") technologies and Long Term Evolution (LTE) technologies, or other "fourth generation" (4G) wireless technologies.

In many geographical regions, considering the nature of the regulatory environment and economic benefits, it may sometimes be advantageous to deploy dissimilar wireless networks to fully utilize a wireless operator's frequency spectrum including one or more paired frequency bands (i.e., frequency bands with separate carrier frequencies for uplink and downlink communications), and one or more unpaired bands (i.e., frequency bands in which both uplink and downlink communications are provided by the same carrier frequency). By deploying a FDD system using paired frequency spectrum allocations and a TDD system using stand-alone unpaired frequency allocations, wastage of valuable spectrum may be avoided.

However, when a TDD system operates on carrier frequencies adjacent to that of an FDD system, the possibility of severe interference may arise. In particular, severe interference may exist for the interference between base stations of the two networks, i.e., between TDD base station (BS) and FDD BS, and between TDD mobile station (e.g., WiMAX MS or LTE TDD user equipment (UE)) and FDD UE. For simplicity, the term "BS" is used throughout this disclosure to represent, for example, a TDD base station (e.g., a WiMAX base station or an "enhanced Node B" (eNB) as known in LTE TDD systems), as well as an FDD base station (e.g., LTE eNB). Also, throughout this disclosure, the term "MS" is used to represent a TDD wireless device, and the term "UE" is used to represent an FDD wireless device. Various methods, e.g. site-planning or special filters installed on base stations, may be employed to effectively mitigate the interference between base stations, e.g., the interference case of TDD BS-FDD BS, and interference between a base station and its associated mobile device(s), e.g., the interference cases of FDD UE-TDD BS and TDD MS-FDD BS. Yet, the interference between mobile devices each associated with a different base station, e.g., interference between TDD MS and FDD UE may be considered to be the most challenging case that poses a relatively greater risk for ensuring coexistence between dissimilar TDD and FDD networks.

Severe performance degradation may occur when a TDD MS and an FDD UE operating concurrently are located in a closed and small space, e.g., a café, a conference room, etc. Additionally, interference between the TDD MS and FDD UE may be severe when the MS and UE are located at an edge of a cellular region (or at a cell edge) which is served by co-located TDD and FDD base stations (i.e., base stations that are located with close geographical proximity and have respective coverage areas with significant overlap), or at the cell edge of two adjacent cells served by non co-located TDD and FDD base stations. In either of these cases, the interference problem between TDD MS and FDD UE is exacerbated, as the received downlink signal of FDD UE (or TDD MS) is typically quite weak, while the interfering TDD MS (or FDD UE) transmits an uplink signal typically at a level close to a maximum output power of the TDD MS (or FDD UE). From the perspective of user-perceived service quality, cell-edge mobile devices in high-density indoor environments, e.g. café, airport etc., are particularly vulnerable to severe performance degradation caused by TDD MS-FDD UE interference. This is because stationary mobiles in such environments are likely to transmit/receive persistently for long periods of time, which may result in prolonged service disruption due to strong interference. This persistent interference problem for indoor hotspot mobile devices could be better appreciated by comparing to that of outdoor mobile devices, which are likely to be mobile and therefore, may not stay in close proximity with each other for long periods of time. Thus, unlike the interference experienced by indoor hotspot wireless TDD or FDD devices, the interference and therefore, the performance degradation of outdoor TDD or FDD devices may be transient.

In some cases, TDD mobile devices each operating with a different TDD base station may experience interference, e.g., due to different frame configurations associated with different TDD networks.

What is needed is a system and method to detect and mitigate interference between networks, e.g., a TDD and an FDD network or two TDD networks, particularly interference between mobile devices, e.g., interference caused at an FDD UE by a TDD MS, interference caused at a TDD MS by an FDD UE operating in the TDD and FDD networks, respectively with adjacent and/or overlapping frequency bands, or interference between a first TDD MS associated with a first TDD BS and a second TDD MS associated with a second TDD BS.

SUMMARY

This disclosure describes techniques for a first TDD BS to detect if an associated first TDD MS has experienced interference from a second TDD MS associated or operational with a second TDD BS. The interference may be detected at the first TDD BS through a particular on-and-off interference pattern of interfering second TDD MS. Once it is confirmed that the first TDD MS has experienced interference from the second TDD MS, the interference at the first TDD MS and/or possible interference caused by the first TDD MS at the second TDD MS may be avoided or alleviated by intelligent scheduling at the first TDD BS.

The apparatus and method of this disclosure provide various features, functions, and capabilities as discussed more fully in the detailed description. For example, this disclosure provides a novel and useful system and method for use in a communications system, with particular application in wireless telecommunication systems such as those adhering to IEEE 802.16-2009 (fixed and mobile WiMAX), 3rd Generation Partnership Project (3GPP) Releases 8 and 9, and LTE-Advanced communication standard specifications and/or communication standards for EvDO, WiMAX, and LTE. However, this disclosure is not necessarily limited to use with such systems and methods. Also, the various embodiments disclosed herein generally may be realized by software enhancements to already existing FDD base stations, FDD wireless devices, TDD base stations and TDD wireless devices without requiring hardware modifications.

In one embodiment, a method of detecting and mitigating interference between a first TDD communications device (or TDD MS) operational with a first TDD BS and a second TDD device or MS operational with a second TDD BS includes processing quality-indicator reports received from the first TDD MS indicating a reception quality of one or more TDD data packets received at the first TDD MS. The processing of the quality-indicator reports may indicate whether the reception at the first TDD MS has experienced interference from the second TDD MS. A determination that the reception at the first TDD MS has indeed experienced interference from the second TDD MS may serve as basis or indicate that the first TDD MS may also cause interference to the reception of TDD data packets at the second TDD MS, e.g., at a later time in the operation. Accordingly, if it is determined that the reception at the first TDD MS has experienced interference from the second TDD MS, a configuration, e.g., an uplink configuration, of the first TDD BS may be adjusted to mitigate (possible) interference caused by the first TDD MS to the second TDD MS.

In some embodiments, the adjustment of the uplink configuration of the first TDD BS includes configuring an uplink operation of the first TDD BS such that the first TDD BS receives TDD data packets from the first TDD device during the interference-free time interval. The interference-free time interval may be determined based on a frame configuration associated with the first TDD BS and a frame configuration associated with the second TDD BS. Additionally, or alternatively, the adjustment of the uplink configuration of the first TDD BS includes configuring an uplink operation of the first TDD BS such that the first TDD BS does not receive TDD data packets from the first TDD device during an unprotected time interval. The unprotected time interval may be determined based on a frame configuration associated with the first TDD BS and a frame configuration associated with the second TDD BS.

In some embodiments, a frequency band associated with at least one of the first TDD BS and the second TDD BS includes a first portion and a second portion. The first portion of the frequency band may include one or more frequencies on which the reception at the first TDD MS experiences interference from the second TDD MS. The adjustment of the uplink configuration of the first TDD BS may include configuring an uplink operation of the first TDD BS such that the first TDD BS receives TDD data packets from the first TDD MS using a frequency from the second portion of the frequency band. The quality-indicator reports from the first TDD MS may include information to identify the first portion of the frequency band, and the first and second portions of the frequency band may be mutually exclusive.

In another embodiment, an apparatus capable of operating in a wireless network and detecting and mitigating interference between TDD wireless devices includes a transceiver, a memory device, a channel-quality module, and a configuration-adjustment module. The transceiver may be configured to exchange TDD data packets with a first TDD MS. The memory device may be configured to store quality-indicator reports indicating a reception quality of one or more TDD data packets received at the first TDD device. The channel-quality module may be configured to process of the quality-indicator reports, and based on the processing, determine whether the reception at the first TDD device has experienced interference from a second TDD device. In some embodiments, a determination of (possible) interference caused by the first TDD MS to the second TDD MS is based on (or indicated by) the determination that the reception at the first TDD MS has experienced interference from the second TDD MS. Accordingly, if it is confirmed that the first TDD MS has experienced interference from the second TDD MS, the configuration-adjustment module may be configured to adjust an uplink configuration of the transceiver to mitigate interference caused by the first TDD MS to the second TDD MS.

In another embodiment, a non-transitory computer-readable medium may include computer-readable instructions physically embodied thereon. The instructions, when executed by a processor associated with in a BS capable of operating in wireless network, cause the processor to carry out the functions of detecting and mitigating interference between a first TDD MS device operational with a first TDD BS and a second TDD MS operational with a second TDD BS. The functions performed by the processor may include processing quality-indicator reports received from the first TDD MS indicating a reception quality of one or more TDD data packets received at the first TDD MS. The processing of the quality-indicator reports may indicate whether the reception at the first TDD MS has experienced interference from the second TDD MS. A determination that the reception at the first TDD MS has indeed experienced interference from the second TDD MS may serve as basis or indicate that the first TDD MS may also cause interference to the reception of TDD data packets at the second TDD MS, e.g., at a later time in the operation. Accordingly, if it is determined that the reception at the first TDD MS has experienced interference from the second TDD MS, a configuration, e.g., an uplink configuration, of the first TDD BS may be adjusted to mitigate (possible) interference caused by the first TDD MS to the second TDD MS.

BRIEF DISCUSSION OF THE DRAWINGS

FIG. 1 provides a representation of conventional interference scenarios between adjacent FDD and TDD networks.

FIG. 2 provides a block diagram of an exemplary embodiment of an FDD base station.

FIG. 3 illustrates a conventional frame structure of a LTE-FDD frame.

Figure 6:
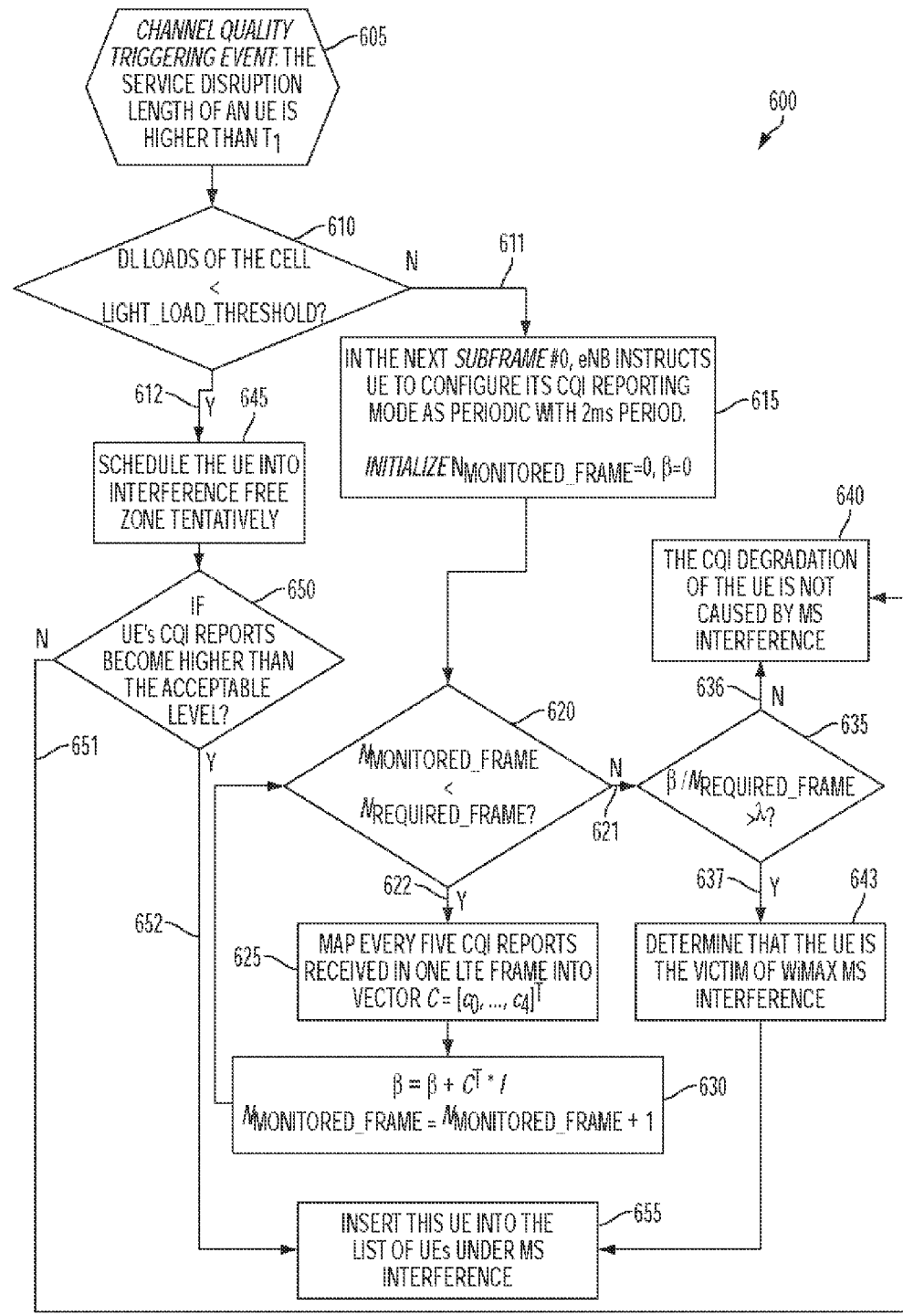

FIG. 6 provides an exemplary flowchart of a method of detecting interference according to an embodiment of this disclosure.

Figure 7:
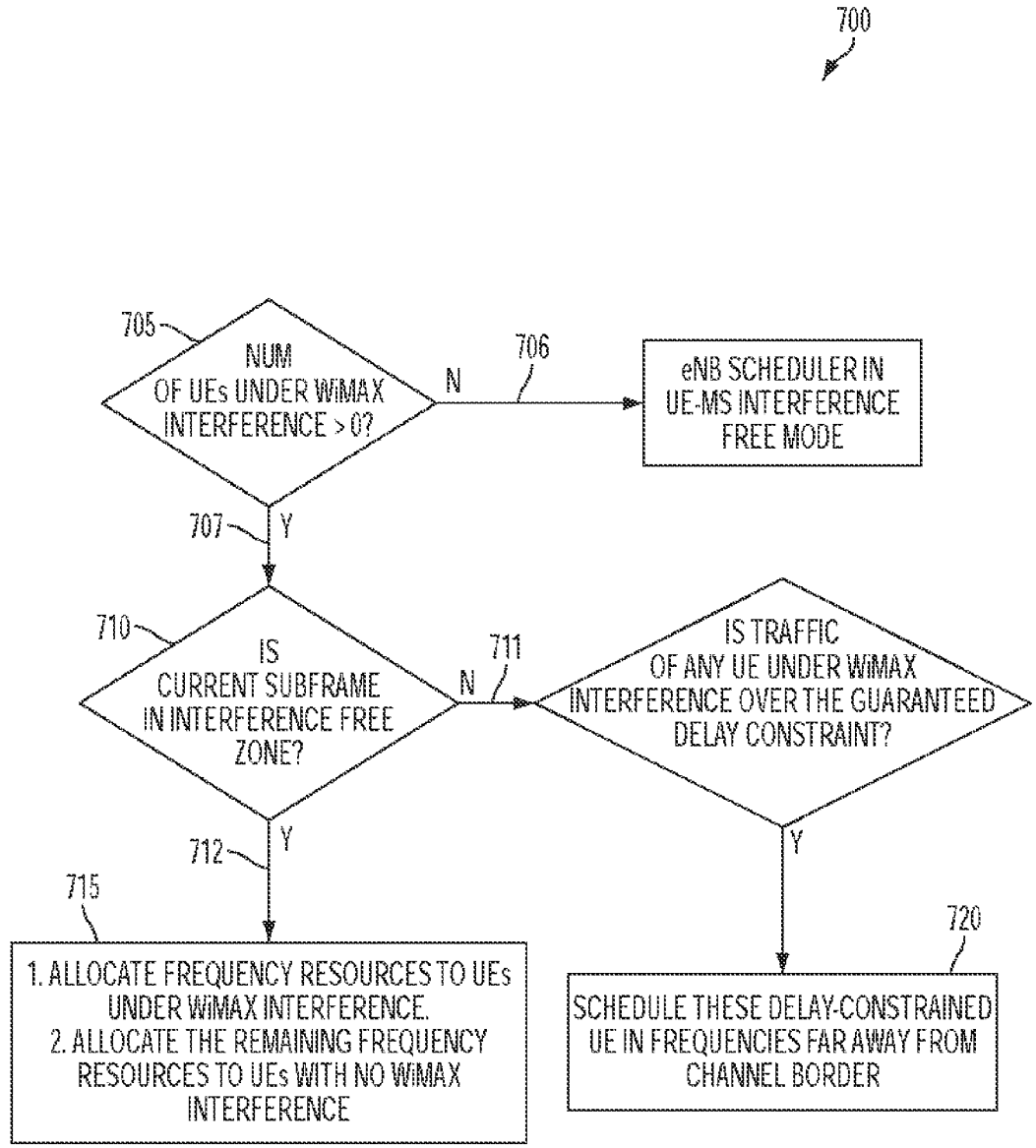

FIG. 7 provides an exemplary flowchart of a method of mitigating interference according to an embodiment of this disclosure.

FIG. 8 illustrates an exemplary frame structure for LTE-FDD frames.

Figure 9:
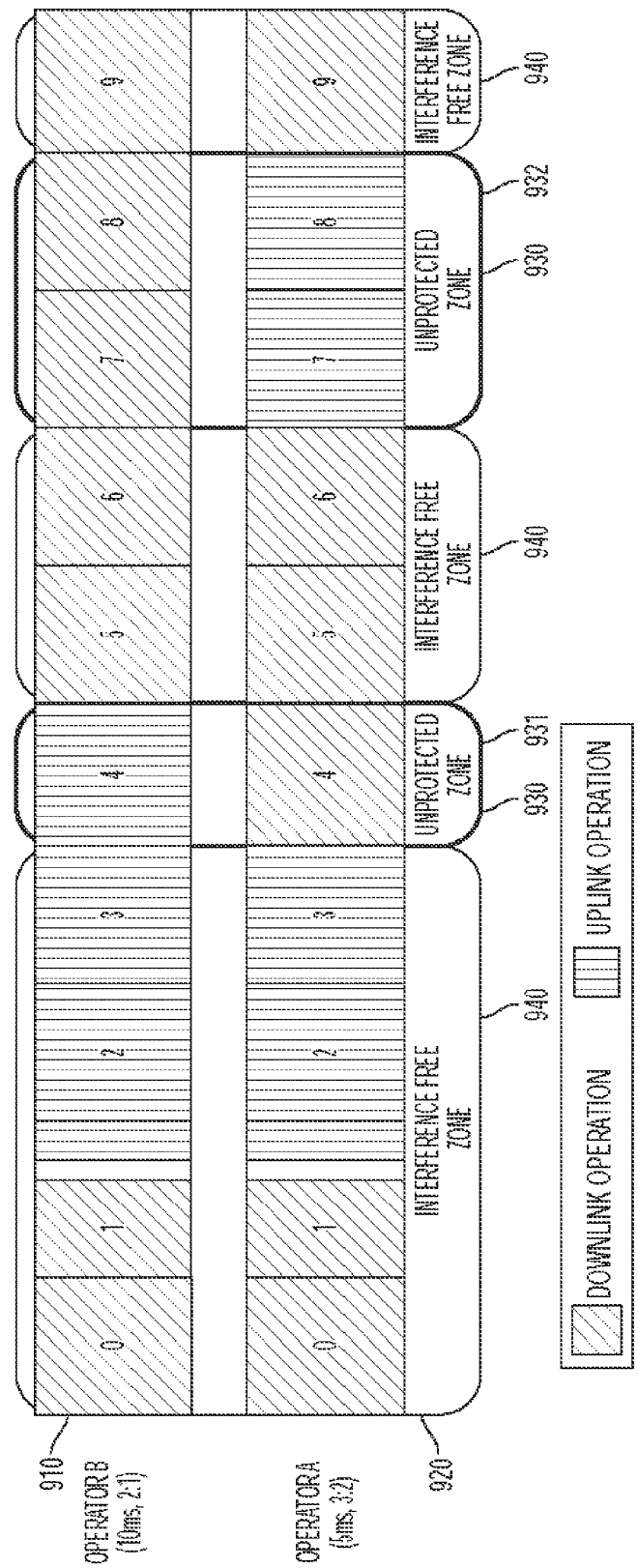

FIG. 9 illustrates frame configurations and an interference pattern between two TDD configuration modes according to an embodiment of this disclosure.

Figure 10:
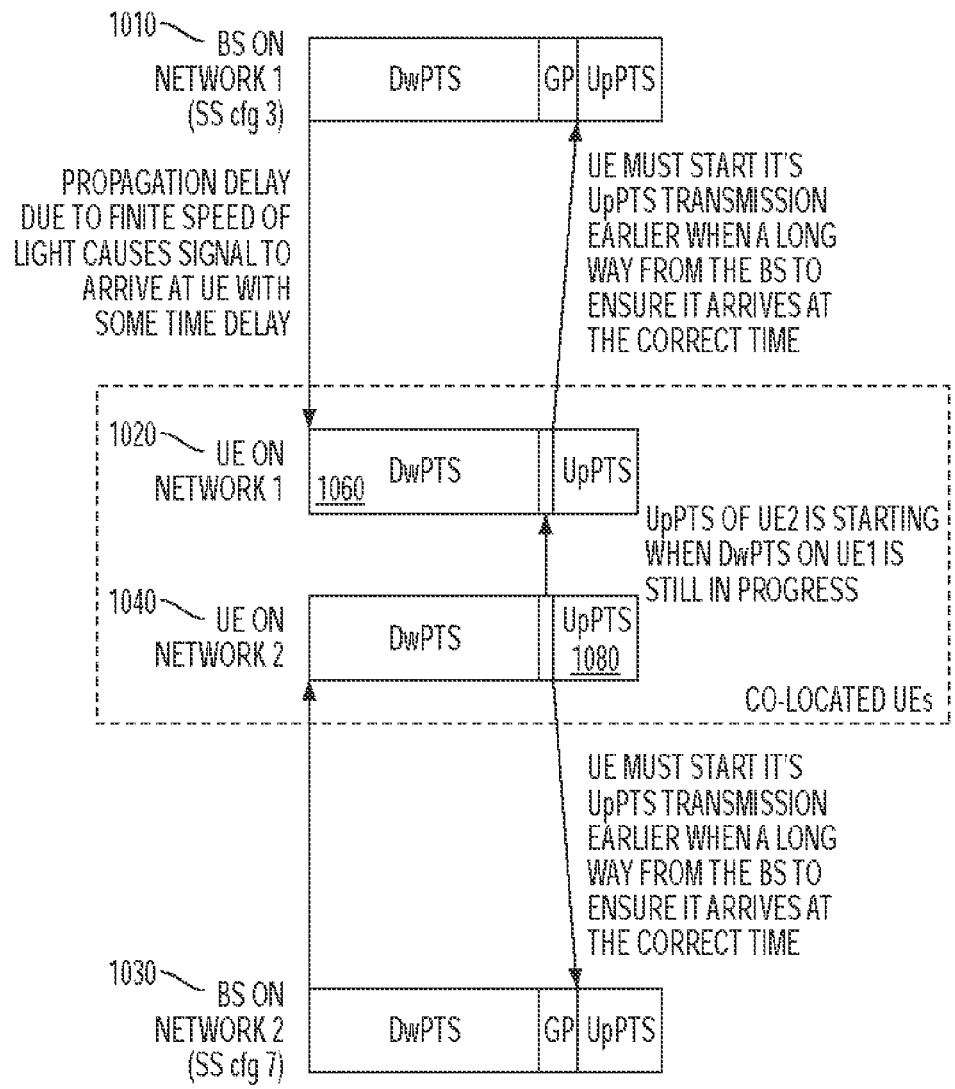

FIG. 10 illustrates communications of two TDD networks each having a different frame configuration.

DETAILED DESCRIPTION

In the discussion of various embodiments and aspects of the apparatus and method of this disclosure, examples of a processor may include any one or more of, for instance, a personal computer, portable computer, personal digital assistant (PDA), workstation, web-enabled mobile phone, WAP device, web-to-voice device, or other device. Further, examples of TDD and FDD networks may include networks operating on WiMAX technology or LTE technology. Also, examples of TDD and FDD devices described in this disclosure may include single mode devices operating under WiMAX or LTE technology, or multimode or dual mode 3G/4G devices, e.g., CDMA EvDO/WiMAX, W-CDMA HSPA/WiMAX, CDMA EvDO/LTE or W-CDMA HSPA/WiMAX devices. Such wireless devices may include wireless phone handsets, smart phones, modems, laptop computers with embedded dual-mode functionality, mobile Internet devices such as used for video streaming, and other user equipment (UE), for example.

Those with skill in the art will appreciate that the inventive concept described herein may work with various system configurations. In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device, or a signal transmission medium), and may include a machine-readable transmission medium or a machine-readable storage medium. For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

FIG. 1 depicts a conventional interference scenario 100 where two unpaired TDD WiMAX carriers (or frequency bands) 110, 112 are located adjacent to (or have at least one common frequency with) an LTE-FDD downlink carrier band 115 and an LTE FDD uplink carrier band 120, respectively. Such spectrum allocation, for example, may correspond to the interference between an adjacent TDD WiMAX carrier at 2.6 GHz and LTE FDD Band 7 (i.e., at 2.5 GHz) in a 4G network deployment. Other frequency bands associated with or described in WiMAX and LTE standards may be considered in accordance with various embodiments of this disclosure. The depicted combination of LTE and WiMAX systems is only used as an example to describe respective FDD and TDD coexistence and interference scenarios. Additionally, later in this disclosure, LTE-FDD and LTE-TDD arrangement is considered for describing interference detection and mitigation between user equipment or devices operating in FDD and TDD networks. Other 3G and 4G networks capable of operating in FDD or TDD mode may be considered as example systems with similar coexistence and interference situations.

In FIG. 1, the desired communication between TDD-WiMAX base stations 125, 127 and mobile stations (or TDD devices) 135, 137, and between FDD-LTE base stations 130, 132 and user equipments (or FDD devices) 140, 142 are represented by the vertical arrows. Adjacent channel interference between the base stations and mobile devices are represented by the diagonal arrows. As shown, at the FDD/TDD border regions, unidirectional interference paths exist between FDD (or LTE) BS/eNB and TDD (or WiMAX) BS, and between FDD (or LTE) devices and TDD (or WiMAX) devices. Four different interference cases are numbered from one to four in FIG. 1. More specifically, the interference scenario 1 corresponds to MS-to-UE (i.e., TDD device 135 to FDD device 140), scenario 2 UE-to-MS (i.e., FDD device 142 to TDD device 137), scenario 3 BS-to-eNB (i.e., TDD BS 127 to FDD BS 132) and scenario 4 eNB-to-BS (i.e., FDD BS 130 to TDD BS 125). The nature of base station to base station interference (i.e., scenarios 3 and 4) may be static, rendering interference between the base stations manageable through careful site-planning and/or installing special filters on the base station experiencing interference. However, the interference problems of mobile-to-mobile (i.e., scenarios 1 and 2) are probabilistic due to various factors including, but not limited to, the locations of the mobile devices being dynamic, and the variability of resources assigned to the mobile devices. The probabilistic nature of mobile-to-mobile interference may make it difficult for the associated base station to accurately identify whether the associated device is experiencing mobile-to-mobile interference. Yet, without the knowledge of the existence, source, and nature of mobile-to-mobile interference, the base station may not take appropriate actions to avoid or alleviate such interference. The situation may further be compounded due to the fact that TDD (or WiMAX) devices, e.g., devices 135, 137, may not be implemented with or capable of channel-based filtering to address any interference issues. Accordingly, their analog front end may pass all signals in the entire allocated transmission band, e.g. in 2.5-2.7 GHz band, such that unwanted emissions and high power signals in adjacent channels may not get sufficiently attenuated.

Figure 2:
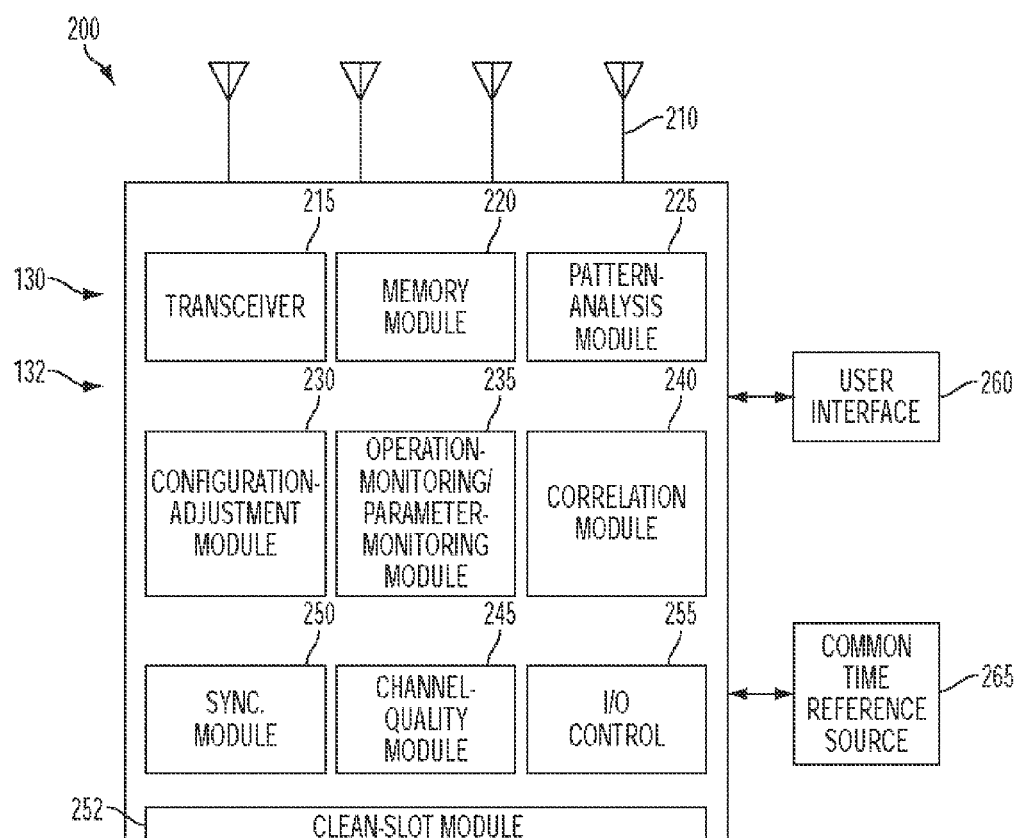

In one or more embodiments, interference detection and mitigation techniques described herein are implemented in one or more base stations, e.g., FDD (or LTE) BS 130, 132, each including one or more components or modules to carry out some or all of the functions described herein. FIG. 2 shows an exemplary embodiment of apparatus 200, e.g., FDD BS 130, 132 configured for interference detection and mitigation. Details of structure and functionality of the illustrated base stations' modules are discussed later in this disclosure.

Also, although not specifically illustrated, it should be understood that, in various embodiments, one or more of devices 135, 137, 140, 142 are configured to operate in accordance with WiMAX and LTE standards, respectively, and may include a 4G transceiver operatively coupled with one or more antennas, one or more processors, a baseband processing module, a parameter-monitoring module, memory, input/output controller, and other peripherals which may be used to carry out some or all of the functionality described herein. The processor(s) may be configured to execute various functionality associated with processing of information received and/or transmitted from the antennas including, but not limited to, processing data packets received from the associated base station and periodic channel quality reports for the base station. The baseband processing module, e.g., operatively connected with the processor(s), may be configured to convert radio frequency (RF) signals from the associated base station to baseband signals. The parameter monitoring module may provide values of one or more operational parameters, e.g. power, of the mobile device. The memory may be configured to store various data and program instructions, e.g., data packets or frames, monitored operational-parameter values, etc. The input/output controller may operate in conjunction with a user interface of the device to allow display of information to a user, for example, as well as to receive input from the user using conventional input/output devices, among other purposes. If any of devices 135, 137, 140, 142 is a dual-mode/multimode device, e.g. configured to operate in both 3G EvDO/HSPA and 4G WiMAX/LTE modes, the device may include an additional 3G transceiver which, along with the 4G transceiver, supports the communication in both 3G and 4G modes. One or more of these wireless devices may be pre-provisioned with an optional GPS receiver which may be used in various ways, e.g., to provide a common time reference source to synchronize the start timings of TDD and FDD frames.

Exemplary TDD-WiMAX and FDD-LTE frame structures are discussed below to show the distinctive pattern of interference created from a TDD (or WiMAX) device to an FDD (or LTE) device. The frame structures may be exploited to detect the interference cases of MS-to-UE (i.e., scenario 1) in a wireless system including both TDD and FDD networks. WiMAX is a TDD-based 4G wireless system that may be configured to operate in various modes, each of which, among other factors, may specify a particular frame configuration for WiMAX frames including downlink time interval and uplink time interval for WiMAX frames (or data packets). For example, in one or more modes, WiMAX network may operate on a 5 ms transmit-to-receive switch point periodicity. Table 1 summarizes a number of different modes available in a WiMAX network. Mode with frame configuration "(29, 18)" is a default WiMAX mode, and is used in this disclosure to describe WiMAX (or TDD) operations. However, other WiMAX modes may be used without altering the system configuration shown in FIGS. 1 and 2.

TABLE 1

Duration of continuous downlink, uplink and gap transmission intervals in TDD WiMAX systems.

| Frame config- | Symbols | | Duration (ms) | | | |
|---|---|---|---|---|---|---|
| uration | Downlink | Uplink | Downlink | TTG | Uplink | RTG |
| (35, 12) | 35 | 12 | 3.6 | 0.105714 | 1.234286 | 0.06 |
| (34, 13) | 34 | 13 | 3.497143 | 0.105714 | 1.337143 | 0.06 |
| (33, 14) | 33 | 14 | 3.394286 | 0.105714 | 1.44 | 0.06 |
| (32, 15) | 32 | 15 | 3.291429 | 0.105714 | 1.542857 | 0.06 |
| (31, 16) | 31 | 16 | 3.188571 | 0.105714 | 1.645714 | 0.06 |
| (30, 17) | 30 | 17 | 3.085714 | 0.105714 | 1.748571 | 0.06 |
| (29, 18) | 29 | 18 | 2.982857 | 0.105714 | 1.851429 | 0.06 |
| (28, 19) | 28 | 19 | 2.88 | 0.105714 | 1.954286 | 0.06 |
| (27, 20) | 27 | 20 | 2.777143 | 0.105714 | 2.057143 | 0.06 |
| (26, 21) | 26 | 21 | 2.674286 | 0.105714 | 2.16 | 0.06 |

An exemplary FDD-LTE frame structure or configuration 300 is shown in FIG. 3. As shown exemplary LTE frame 300 spans a total time interval of 10 ms and includes 20 time slots (numbered from 0 to 19), each slot being equal to 0.5 ms. Also, in one embodiment, two time slots may form an LTE subframe, such that one LTE frame has ten FDD-LTE subframes, each having a time interval equal to 1 ms. Other frame structures with different time intervals and/or number of time slots may be used. For the purposes of detecting interference between TDD and FDD device, in one or more embodiments, a 5 ms WiMAX frame (e.g., with default (29, 18) mode), and a 10 ms LTE-FDD frame (e.g., as shown in FIG. 3) are synchronized or aligned with respect to the start of LTE slot #0 using, e.g., synchronization module 250 of FDD BS 130 or BS 132, such that the start of a transmission of the FDD-LTE frame (e.g., at LTE slot #0) is aligned with the start of a transmission of the TDD-WiMAX frame. The synchronization may be achieved based on a common time reference source including, but not limited to, a Global Positioning System (GPS) or a device or system configured to operate in accordance with the IEEE 1588 standard. It is expected that an operator of a LTE or WiMAX network may use this frame alignment to ensure synchronization of frame start timing across the whole network. As long as LTE and WiMAX networks use the same common time reference source (e.g. GPS), the frame start timing will be aligned across both TDD-WiMAX and FDD-LTE networks.

Figure 4:
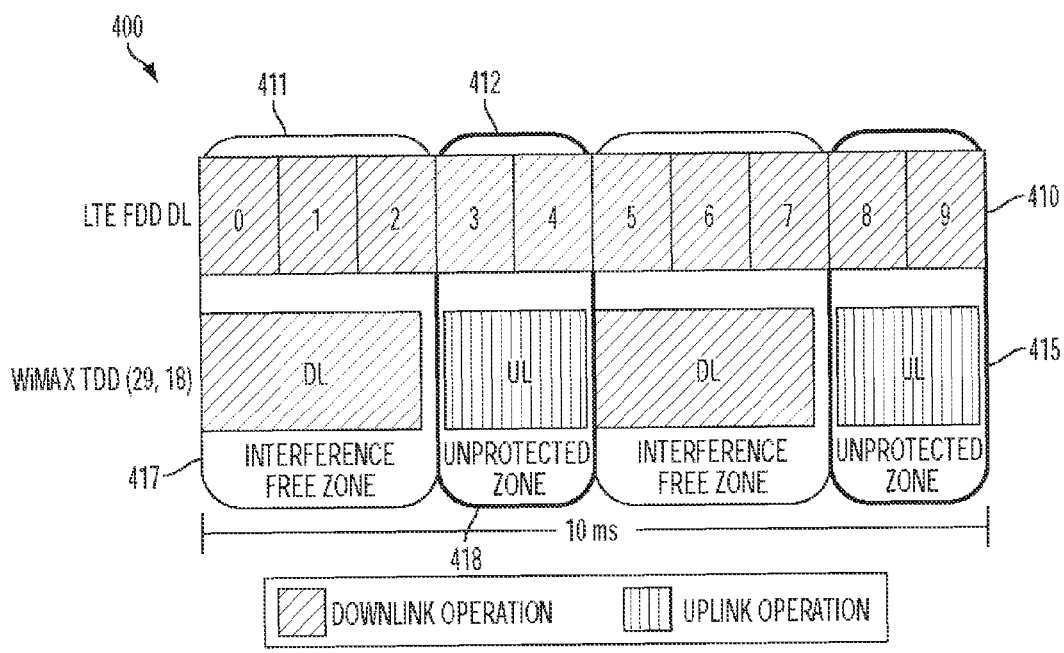
FIG. 4 illustrates an interference pattern from a TDD wireless device to an FDD wireless device according to an embodiment of this disclosure.

When an LTE UE e.g., FDD device 140, is under persistent interference from WiMAX MS, e.g., TDD device 135, a received signal quality of the LTE UE may exhibit a distinctive repetitive pattern with a periodicity equal to or at least directly related to a time interval covered by a WiMAX frame. For example, LTE UE's received signal quality may show a pattern with 5 ms periodicity due to the duty cycle of interfering WiMAX MS uplink transmission. FIG. 4 illustrates, as an example, the interference pattern using the default (29, 18) WiMAX operating mode for two WiMAX frames (or data packets) 415 each having a total time interval of 5 ms aligned with an LTE frame (or data packet) 410 including ten subframes (numbered from 0 to 9) and having a total time interval of 10 ms. In accordance with the default (29, 18) WiMAX mode, each WiMAX frame includes a downlink ("DL") time interval during which the WiMAX MS (e.g., TDD device 135) may not create any interference to LTE UE (e.g., FDD device 140) for the reception of one or more subframes of LTE frame 410 from LTE BS 130. For example, as shown, the DL time interval or "interference-free zone" 417 of WiMAX frame 415 may be aligned with first three subframes 411 (numbered 0, 1 and 2) of LTE frame 410, and therefore, the WiMAX MS may not interfere with the reception of subframes 411 at the LTE UE during the interference-free zone. In some embodiments, unlike as shown in FIG. 4, the interference-free zone may not completely overlap with DL time interval 417 of WiMAX frame 415, and therefore, may be shorter or longer than DL time interval 417. The other time interval of WiMAX frame 415 may include an uplink ("UL") time interval 418 during which the WiMAX MS transmits or uplinks WiMAX data packets to the WiMAX BS, and such uplink transmission may interfere with the reception of one or more subframes 412 (e.g., subframes 3 and 4) of LTE frame 410 at the LTE UE. In other words, the LTE UE may only experience interference from the WiMAX MS during UL time interval 418 of the WiMAX frame, labeled as "unprotected zone" in the figure. However, in some embodiments, as shown in FIG. 4, the unprotected zone may not completely overlap with UL time interval 418 of WiMAX frame 415, and therefore, may be shorter or longer than UL time interval 418.

In 3GPP LTE standards, Reference Signal Received Power (RSRP) is an indicator of the desired signal strength for the downlink connection, i.e., the transmission of data packets from the base station to the wireless device. RSRP is defined as the linear average over the power contributions of the Resource Elements (REs) which carry cell-specific reference signal (RS) within the considered measurement frequency bandwidth for a specific cell. To take the interference level into account, an LTE UE may also compute Reference Signal Received Quality (RSRQ) that is defined as, RSRQ=N× RSRP/RSSI, where N is the number of Resource Blocks (RBs) of the LTE carrier Received Signal Strength Indication (RSSI) measurement bandwidth. For the calculation of the ratio, RSRQ, the measurements for both RSRP and RSSI are made over the same set of resource blocks. RSRQ may therefore capture the combined effect of (wanted) signal strength and (unwanted) interference level, and may be interpreted as an indicator for Signal to Interference and Noise Ratio (SINR) at the LTE UE receiver.

As shown in FIG. 4, in order for the LTE-FDD BS (e.g., BS 130) to detect and mitigate interference between wireless devices, the LTE BS may use a-priori knowledge of the WiMAX TDD DL/UL frame configuration, e.g., to identify the interference-free zone and unprotected zone. This may be achieved by configuring the LTE BS with a system parameter, e.g., a frame structure parameter indicating the TDD-WiMAX frame configuration (shown in FIG. 4) including DL/UL duty cycle, and therefore, interference-free and unprotected zones, of co-located WiMAX BS, e.g., BS 125. In some embodiments, apart from the LTE BS, an associated LTE UE (e.g., device 140) may be made aware of the existence of adjacent WiMAX carrier frequency and WiMAX operating mode via high layer signaling. Accordingly, the UE may then easily determine whether it is under the interference from the WiMAX MS, for example, by identifying the particular DL/UL pattern including alternating interference-free zone and unprotected zone pattern of WiMAX systems. The potentially-affected UE may utilize the monitored relevant interference information including RSRP and RSRQ information for detecting interference for the LTE subframe. However, the LTE UE may not report RSRP or RSRQ to the LTE BS every subframe, and thus the LTE BS may not have a complete picture of the received signal quality at the LTE UE. Accordingly, a mechanism is proposed to configure the potentially-affected LTE UE 140 to report quality-indicator reports, e.g., channel quality information (CQI), acknowledgement (ACK) or non-acknowledgement (NACK) signals, or some other type of quality reports, to LTE BS 130 to detect an interfering WiMAX MS 135.

Turning to interference scenario 2 shown in FIG. 1, where FDD-LTE UE 142 interferes with TDD-WiMAX MS 137, the problem occurs when MS 137 is operating in a carrier close to a frequency in LTE FDD uplink carrier band 120, as well as is in close proximity (geographically) with UE 142, e.g., when both MS 137 and UE 142 are indoor in a café, a lecture hall, or any other room. Therefore it may not be straightforward to assume that a UE (e.g., UE 140) experiencing interference from an MS (e.g., MS 135) will be causing reciprocal interference to that MS, as it depends whether a WiMAX carrier that is close or adjacent to a frequency in LTE FDD uplink carrier band 120 is in use in the same location as MS 135 that is causing interference to UE 140. Accordingly, for interference scenario 2, while a detection mechanism solely within the LTE system may not be practical, there are approaches that may be taken to proactively try to prevent the LTE wireless devices from causing interference to the WiMAX wireless devices.

Refer to FIG. 2, which shows an exemplary apparatus 200 depicting an embodiment of FDD BS 130, 132. Apparatus 200 includes various functional modules and components that may be configured to detect and mitigate interference between wireless devices, e.g., interference from TDD device 135 to FDD device 140 (as FDD BS 130) and interference from FDD device 142 to TDD device 137 (as FDD BS 132). In some embodiments, apparatus 200 includes antennas 210, transceiver 215, memory module 220, pattern-analysis module 225, configuration adjustment module 230, parameter or operation-monitoring module 235, correlation module 240, channel-quality module 245, synchronization module 250, clean-slot module 252, input/output (I/O) control module 255, user interface 260, and common time reference source 265. For clarity, resources and/or components of apparatus 200 not required or related to interference detection or interference mitigation are not shown in FIG. 2 or subsequent figures of this disclosure, but those resources/components will be appreciated by a person of ordinary skill in the art.

In one or more embodiments, one or more modules of the apparatus 200, or other components that the module may be connected with (but are not shown in any of the figures) may include one or more processors and/or individual memory modules, to perform the functions and processes described herein. Also, although the modules in FIG. 2 are shown as individual components or elements, in one or more embodiments, those modules may be combined into one or more devices, one or more software programs, or one or more circuits on one or more chips. In some embodiments, some modules or components of apparatus 200 may be part of a system which is located geographically remotely from the rest of the modules or components of apparatus 200. In such a case, the remotely located groups of modules may be operatively connected with each other through a wired or wireless network (not shown) using necessary interfaces and components. Such network may include one or more of a private TCP/IP network, the Internet, or a private or public radio frequency (RF) network.

As would be understood by a person with skill in the art, the functional block diagram of FIG. 2 is presented merely an aid in understanding the various functions of apparatus 200, and actual implementation of the desired functionality may be implemented by fewer or more functional modules, implemented by software code operating on one or more processors.

Transceiver 215 may be operatively connected to antenna 210 to exchange data packets with one or more wireless devices. For example, if apparatus 200 is configured as an FDD base station (e.g., FDD BS 130 or 132) to be operational in an FDD network, transceiver 215 may be configured to communicate FDD data packets with an FDD device (e.g., FDD device 140 or 142). Further, transceiver 215 may be coupled with or may include a baseband processing module (not shown) which may be configured to convert radio frequency (RF) signals received from transceiver 215 to baseband signals. In some embodiments, transceiver 215 of FDD BS 130 transmits packets to FDD device 140 using a frequency from FDD downlink frequency band 115. Similarly, transceiver 215 of FDD BS 132 may receive packets from FDD device 142 using a frequency from FDD uplink frequency band 120.

Memory 220 may be configured to store various data and program instructions to facilitate the interference detection and mitigation operations of one or more modules of (or associated with) apparatus 200. For example, memory 220 may store reports indicating reception quality of data packets at an FDD device (e.g., device 140) associated with apparatus 200. Additionally, or alternatively, memory 220 may store threshold values and/or real-time values for various operational parameters (e.g., device power, service level, network load or traffic, frequency band information, TDD or FDD frame configuration, number of transmitted or received data packets, outputs generated by the modules, etc.) of the TDD or FDD wireless network within which apparatus 200 is operating.

Input/output controller 255 may operate in conjunction with user interface 260 to allow display of information to a user, for example, as well as to receive input from the user using conventional input/output devices, among other purposes.

Scenario 1: TDD MS to FDD UE Interference Case

In some embodiments, to determine interference between wireless devices (e.g., between TDD device 135 and FDD device 140), channel-quality module 245 (arranged in, e.g., BS 130) is coupled to memory 220 and is configured to process the quality-indicator reports received by apparatus 200 from FDD device 140. As a result of such processing, channel-quality module 245 may determine whether or not FDD device 140 has experienced interference from TDD device 135. The quality-indicator reports from FDD device 140 may include values of one or more various parameters such as Reference Signal Received Power (RSRP), Reference Signal Received Quality (RSRQ), Channel Quality Information (CQI), Acknowledgement (ACK) or Non-acknowledgement (NACK) signals, etc.

Figure 5:
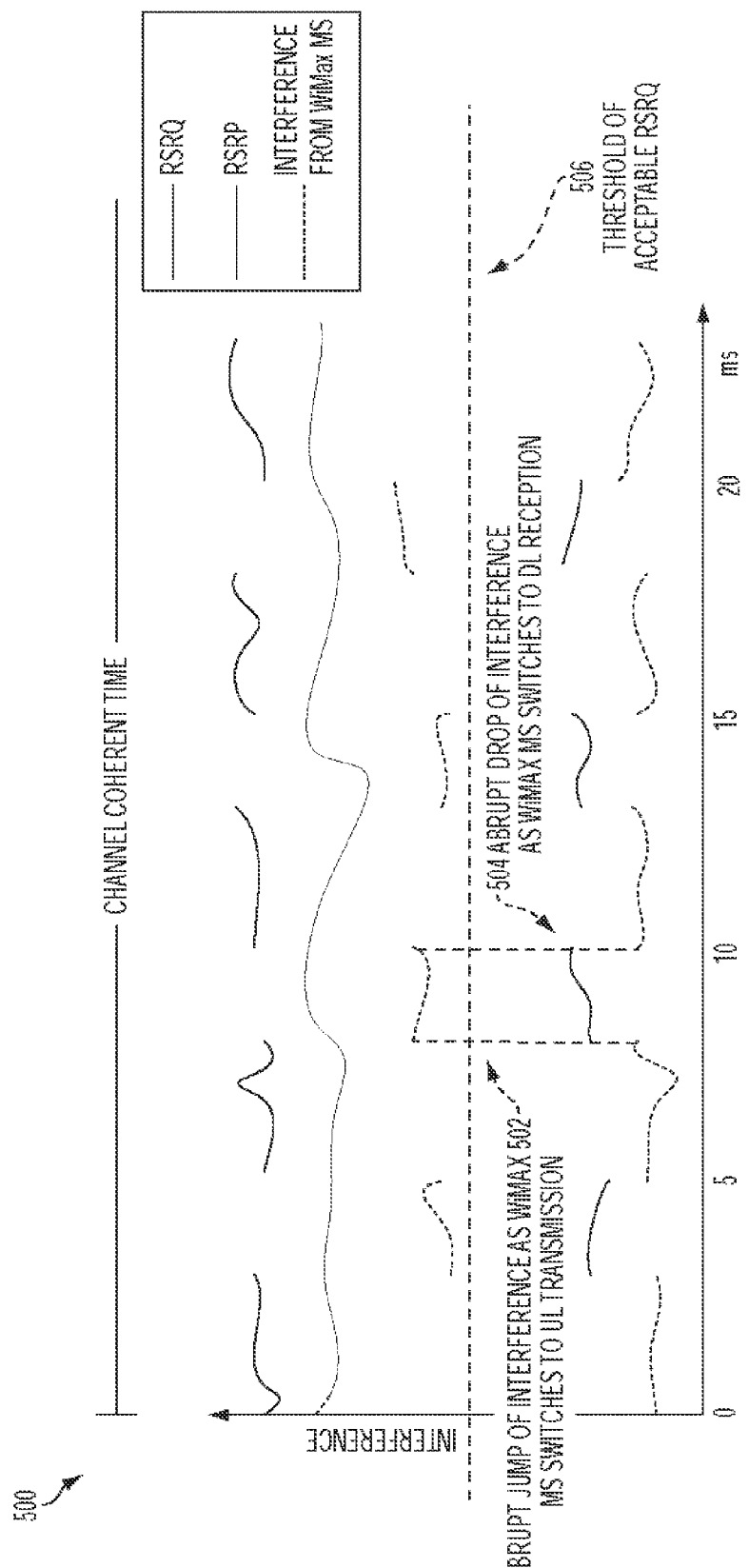
FIG. 5 illustrates a received interference pattern for the FDD wireless device.

FIG. 5 graphically illustrates how RSRQ and RSRP reports may be used to determine interference at FDD device 140 from TDD device 135. With regard to RSRP at FDD device 140, it should be noted that the level of RSRP exhibits little variation across multiple FDD (LTE) frames, perhaps because the channel coherence time for FDD device 140 (when device 140 is stationary) is well above the total duration (e.g., 10 ms, as shown in FIG. 3) of an FDD (LTE) frame. The channel coherence time can be defined as a statistical measure of the time duration over which the channel responses are strongly correlated. In general, coherence time is inversely related to Doppler frequency, $f_d$, typically expressed as $$T_c = \frac{0.423}{f_d}.$$

For example, with a center frequency of 2.6 GHz, the coherence time of 3 km/h pedestrian user is about 30 ms. However, channel-quality module 245 at FDD base station 130, by processing RSRQ or CQI reports, may determine that the interference caused by stationary TDD (e.g., WiMAX) device 135 jumps (labeled as 502) or drops (labeled as 504) abruptly every 2 or 3 ms with respect to a threshold 506 of an acceptable level of RSRQ (or with respect to an acceptable-interference threshold or criterion) when TDD device 135 switches between transmit and receive modes in every TDD frame of duration equal to 5 ms. Consequently, FDD device 140 may observe an abrupt change of RSRQ and, therefore, may determine TDD device interference, even though its RSRP remains relatively unchanged. In other words, the estimated coherence time, based on the rate of change of RSRP values, may be much larger than what is estimated based on RSRQ values.

With regard to differentiating between interference between TDD and FDD devices and interference at an FDD device from other sources, it may be worth noting that LTE and WiMAX systems, each of which are based on OFDM, may have no intra-cell interference. Accordingly, the only determination FDD (LTE) BS 130 has to make in order to detect external TDD interference from TDD (WiMAX) device 135 is to discriminate between inter-sector downlink interference. In some embodiments, it may be easier for FDD BS 130 to detect the interference using, e.g., interference pattern detection in LTE systems than in other cellular systems such as CDMA, which may suffer from intra-sector interference problem. For a stationary or slowly moving FDD device not suffering from TDD device interference, the interference may mostly result from adjacent FDD base stations' downlink transmission. Such interference may be calculated from downlink (DL) transmission rate or load (i.e., from an FDD base station to its associated FDD device(s)) of the interfering FDD base stations, and the channel paths between the affected FDD device and the interfering FDD base stations. Taking into account the semi-static nature of DL loads (i.e., DL load of an FDD base station may not change rapidly, e.g., in a millisecond scale, as the load is equal to the sum of intended traffic stream of many active wireless FDD devices in the coverage area of the FDD base station), and large channel coherence time, the interference level of a stationary FDD device may be reasonably assumed to remain relatively unchanged across multiple FDD frames or data packets. Thus, it may be reasonably concluded that interference from the neighboring FDD base station is unlikely to cause abrupt RSRQ change of the FDD device. Additionally, or alternatively, information related to transmission rate or load of the adjacent FDD base station may be made available to the FDD base station serving the affected FDD device using, e.g., X2 interface. The load information may enable the serving FDD base station to determine whether the abrupt change of interference (in terms of RSRQ values) is caused by the change of loads of adjacent FDD base stations or some other sources.

For example, in a well-designed FDD LTE network, FDD LTE device(s) operating on the edge of the cell (or coverage area) of the FDD base station may be able to achieve a guaranteed minimum throughput most of the time. However, if an FDD BS receives and processes reports indicating a service disruption for one of the FDD devices which are in communication with the FDD BS, e.g., by either receiving a predetermined number of consecutive NACKs or very low values of CQI, the FDD base station may take actions to find out the cause of service disruption. For example, in some embodiments, for FDD BS 130 being aware of neighboring or co-located TDD BS 125 operating on adjacent carrier frequencies (from within TDD frequency band 110), FDD BS 130 may utilize channel-quality module 245, alone or in combination with other modules, to initialize an interference detection mechanism for determining whether FDD device 140 is experiencing interference from TDD device 135.

The following review of CQI feedback mechanisms in an LTE wireless system is provided to understand the use of CQI reports as quality-indicator reports for interference detection and mitigation operations described herein. A variety of CQI feedback schemes are known to be part of the LTE standard. For example, an LTE UE (e.g., device 140) may be configured, using Radio Resource Control (RRC) signaling, to periodically provide CQI reports to the LTE BS (e.g., BS 130) over the PUCCH (Physical Uplink Control Channel), when the LTE UE is not scheduled for data transmission. In some embodiments, periodic CQI reports over multiple FDD LTE frames may be required by the FDD LTE BS 130 to decide with reasonable confidence whether the interference at FDD LTE device 140 is due to TDD device 135 (which is in close proximity). Both wideband and LTE UE-selected subband CQI feedback schemes may be utilized for periodic CQI reporting. Also, a period of the CQI reports may be selected by an operator of apparatus 200, or may be dynamically configured within apparatus 200. For example, the CQI report period may be configured equal to 2, 5, 10, 16, 20, 32, 40, 64, 80, or 160 ms. For the wideband CQI reporting, FDD LTE device 140 may send a single wideband CQI report corresponding to the entire FDD channel bandwidth. In the case of the LTE UE-selected subband CQI reporting, FDD LTE device 140 may send a CQI report for each subband. As another CQI reporting option, FDD LTE device 140 may provide non-periodic CQI reports with other multiplexed data transmission over PUSCH (Physical Uplink Shared Channel). Furthermore, FDD LTE BS 130 may instruct FDD LTE UE 140 to provide on-demand, non-periodic CQI reports that are carried on the PUSCH.

In general, FDD BS 130 may formulate the detection of interference from TDD device 135 as a statistical hypothesis testing problem, with the following hypotheses:

$H_0$: CQI variation is the result of an interfering TDD device, and $H_1$: CQI variation is NOT the result of an interfering TDD device.

Accordingly, FDD BS 130 may exploit the statistical properties of CQI reports to infer that the CQI degradation in one or more FDD subframes (e.g., two out of every five FDD subframes) within a time interval equal to duration of a TDD frame is caused by the interference from closely-spaced TDD device 135. For example, the variability of CQI values may be very high (i.e., high standard deviation of CQI values), if calculated directly from all CQI values corresponding to a complete FDD LTE frames. However, the variability of CQI reports may be low if calculated from CQI values only in the interference-free zone and in the unprotected zone, separately. The sub-band CQI reports may statistically become higher farther from channel border 160 of adjacent TDD and FDD frequency bands. However, in this disclosure (as will be described later), as an alternative to using the above-discussed statistics-based analytical approaches, a low-complexity interference detection mechanism is implemented in apparatus 200.

In some embodiments, channel-quality module 245 is coupled with operation-monitoring module 235, such that a decision to start the processing of quality-indicator reports and the type of processing to be carried out at channel-quality module 245 is related to an outcome provided by operation-monitoring module 235. For example, channel-quality module 245 may process the quality-indicator reports responsive to a determination by operation-monitoring module 235 that a triggering event in the FDD network has occurred. The triggering event may include a service disruption event between FDD BS 130 (or transceiver 215) and FDD device 140, e.g., occurring for a particular continuous time period. The service disruption event may be defined as FDD BS 130 experiencing an increase in the probability of not receiving ACK signals indicating correct reception of data packets at FDD device 140. Typically, the probability of not receiving an ACK signal for initial downlink transmission is around 10% (or 0.1) or may be some other value as configured by FDD BS 130. In the case where there's a sudden increase in NACK signals for downlink transmission due to abrupt change of channel condition, the probability of not receiving an ACK signal may be lowered by FDD BS 130 power control mechanism to the pre-configured or known targeted probability equal to around 10%. Furthermore, such a disrupting channel condition may not be persistent. However, during a service disruption, the probability of not receiving an ACK signal may be much higher and may also be persistent as the mechanism, e.g. power control mechanism, may be ineffective for combating interference from TDD mobile devices, e.g., TDD device 135.

In some embodiments, to minimize the processing burden at FDD BS 130, channel-quality module 245 may start processing the quality-indicator reports after it is determined (e.g., by operation-monitoring module 235) that a transmission power of FDD device 140 is greater than a transmission power threshold. For example, such decision may be based on an observation that the TDD-to-FDD interference is most likely to happen when FDD device 140 is at a cell-edge or indoor, and is transmitting close to a level which is greater than a power threshold and/or at about maximum transmit power level. The power threshold used here may be pre-selected or configured depending on various factors, such as number of users in the cell covered by FDD BS 130, average load per user, etc.

In some embodiments, channel-quality module 245 processes the quality-indicator reports using more than one technique, and selects a particular processing technique based on a determination (made, e.g., by operation-monitoring module 235) whether a rate of transmission of FDD data packets from FDD BS 130 to FDD device 140 (i.e., FDD DL rate) is less than or greater than a load threshold. The load threshold may be calculated based at least on a rate of transmission of TDD data packets from TDD BS 125 to TDD device 135 (i.e., TDD DL rate) or a TDD frame configuration at TDD BS 125. For example, the load threshold for FDD BS 130 may be set as equal to (or less than) the TDD DL rate, or to a load level that may be accommodated by the interference-free interval that is associated with or inherently provided by the TDD frame configuration. Accordingly, the load threshold may be a certain percentage (less than 100%) of the FDD DL rate. The percentage value may be determined based on a ratio of downlink (DL) time interval and uplink (UL) time interval of TDD data packets or frames exchanged between TDD BS 125 and TDD device 135. For example, as shown in FIG. 4, for a TDD frame of total duration equal to 5 ms, DL interval may be equal to about 3 ms and UL interval may be equal to about 2 ms, and the percentage value may be set to 3/(3+2)=0.6 or 60%. Accordingly, the load threshold may be set equal to about 60% of the FDD DL rate. This may be based on the fact that all the FDD intended DL traffic could be accommodated by only scheduling during the interference-free zone, which is DL transmission interval 417 of TDD frame structure. Thus, as long as the number of FDD DL subframes required during the interference-free time interval (e.g., 5 ms) is less than the number of TDD DL subframes in the same time interval, FDD BS 130 may have the freedom of scheduling all DL traffic to FDD device 140 in the interference-free zone to avoid any interference from nearby TDD devices, e.g., TDD device 135.

In some embodiments, if FDD DL rate is less than the load threshold, channel-quality module 245 may analyze whether the reception quality (in terms of, e.g. CQI reports, RSRQ) at FDD device 140 has met an acceptable-interference threshold, as shown in FIG. 5, e.g., after tentatively scheduling FDD device 140 into interference-free zone. And, if it is determined that the acceptable-interference threshold has been met or exceeded, it may be concluded by channel-quality module 245 that FDD device 140 has experienced interference, and module 245 may then place identifying information of FDD device 140 in a list of FDD devices that are identified by FDD BS 130 as experiencing interference from TDD device 135. This list may be stored and maintained in memory 220, or other internal or external memory devices. Further, to address interference issue for each FDD device 140 in the list, configuration-adjustment module 230 may adjust a downlink (i.e., transmission from FDD BS 130 to FDD device 140) configuration of transceiver 215. For example, configuration-adjustment module 230 may configure transceiver 215 such that transceiver 215 continues to transmit FDD data packets to FDD device 140 at least during an interference-free time interval. In some embodiments, clean-slot module 252 may determine the interference-free time interval based on downlink time interval 417 of TDD frame structure 415. For example, as shown in and discussed above with respect to FIG. 4, the interference-free time interval (or zone) may be related to (e.g., completely or partially overlap) downlink time interval 417. In some embodiments, the frame structure of TDD frames of TDD BS 125 may be provided as a priori information to FDD BS 130 via some network management system. Alternatively, FDD BS 130 may be configured to analyze and determine the TDD frame structure. The TDD frame structure may remain unchanged over a long period of time, e.g., a period corresponding to duration of several TDD frames, or in general, for several hours or even days.

Additionally, or alternatively in the case where FDD DL rate is greater than the load threshold, FDD BS 130 may configure FDD device 140 such that FDD device 140 periodically provides the CQI reports as the quality-indicator reports (which are stored in memory 220) with the period being configurable, as discussed above. In one embodiment, the period of CQI reports is selected or configured such that the CQI reports are received at FDD BS 130 more frequently than before the start of the interference detection at FDD BS 130. For example, for one FDD LTE frame of duration 10 ms, FDD device 140 may be configured to provide five CQI reports with 2 ms periodic CQI reporting. As discussed above, either wideband or sub-band CQI reporting may be used, according to network implementation. However, it is noted that sub-band CQI reports near channel border 160 (i.e., frequencies common to both TDD and FDD frequency bands) may be more accurate than wideband CQI reports in terms of the interference level from TDD device 135 uplink transmit power leakage, since TDD device 135 interference may be strongest near the channel border.

Channel-quality module 245 may then process one or more periodically-received CQI reports for one or more FDD data packets, and provide the processed report(s) to pattern-analysis module 225 to ascertain an actual CQI (or quality-indicator) report pattern in the processed report(s) for each FDD data packet. The actual CQI report pattern, which may be a result of TDD DL/UL duty cycle of TDD frames, may be further processed (as described later) to determine that FDD device 140 has experienced interference from TDD device 135. Additionally, pattern-analysis module 225 may be configured to determine an expected CQI (or quality-indicator) report pattern of FDD device 140 based on a frame configuration of TDD frames. The expected CQI pattern over one FDD LTE radio frame (e.g., I=[1 1 0 1 0]) is given in Table 2 below. Here, "1" in the actual or expected pattern indicates that FDD device 140 is experiencing interference, and "0" indicates no interference at FDD device 140.

TABLE 2

The expected CQI report pattern over one LTE radio frame

| | Subframe | | | | | | | | | |
|---|---|---|---|---|---|---|---|---|---|---|
| | #0 | #1 | #2 | #3 | #4 | #5 | #6 | #7 | #8 | #9 |
| RSRQ | ≥$RSRQ_{min}$ | | | <$RSRQ_{min}$ | | ≥$RSRQ_{min}$ | | | <$RSRQ_{min}$ | |
| 2 ms CQI Reporting | ≥1 | — | ≥1 | — | 0 | — | ≥1 | — | 0 | — |

Based the actual and expected CQI pattern, the interference detection problem may be formulated as a sequence-detection problem in apparatus 200. Accordingly, correlation module 240 of apparatus 200 may be configured to correlate the actual CQI report pattern with the expected CQI report pattern to determine if FDD device 140 has experienced interference. In some embodiments, correlation module 240 may calculate a correlation value representing a correlation between the expected CQI report pattern and the actual CQI report pattern, calculate an average correlation value for a sequence of actual CQI report patterns corresponding to multiple FDD frames, and compare the average correlation value with a predetermined threshold value to determine if the reception at FDD device 140 has experienced interference from TDD device 135.

As discussed above, the expected CQI pattern in accordance with the exemplary TDD frame configuration 410 shown in FIG. 4 and Table 2, is denoted as I=[1 1 0 1 0]. Correlation module 225, before calculating a correlation value, may be configured to map "1" in the (actual or expected) CQI report pattern to "1," and map "0" in the CQI report pattern to "−1". For example, the expected CQI report pattern, I=[1 1 0 1 0] maps to [1 1 −1 1 −1] before correlating with an actual CQI pattern, e.g., A=[1 1 0 1 0], which also maps to [1 1 −1 1 −1]. Correlation module 225 may calculate a correlation value for these CQI patterns and yield the correlation value equal to 5, indicating a perfect match. In the case where FDD device 140 is not suffering from TDD device 135 interference and channel conditions are acceptable, pattern-analysis module 220 may determine the CQI report pattern as [1, 1, 1, 1, 1] with high probability which, after calculating correlation using correlation module 225, may result in the correlation value being equal to 1. In the case of unacceptable channel conditions, the actual CQI report pattern may be determined as [−1, −1, −1, −1, −1] with high probability, and which may result in the correlation value equal to −1. And, in the case of channel conditions swaying between unacceptable and acceptable, the randomness of having "1" or "0" in the five CQI values in one FDD LTE frame may result in the expected average correlation value being equal to about zero over a sequence of FDD LTE frames. In some embodiments, correlation module 225 calculates correlation values for several FDD LTE frames, and calculates the average of all the calculated correlation values as a representative correlation value. Such calculation over several frame intervals may prevent false interference detection as random variations may cause a reasonably high error detection probability.

Based on the correlation of the actual and expected CQI patterns, if the interference at FDD device 140 is confirmed, channel-quality module 245 may place identifying information of FDD device 140 in the list of FDD devices including FDD devices 140 affected by TDD device interference. Further, clean-slot module 252 may determine an interference-free time interval, which may be used by configuration-adjustment module 230 to adjust a downlink configuration of FDD device 140. The interference-time interval may or may not be aligned with DL time interval 417 of TDD frame structure 410. Configuration-adjustment module 230 may configure transceiver 215 such that transceiver 215 transmits FDD data packets to FDD device 140 during the interference-free time interval.

Additionally, or alternatively, configuration-adjustment module 230 may adjust the downlink configuration of transceiver 215 such that transceiver 215, responsive to a determination (by, e.g., channel-quality module 245) that a data-quality requirement of the FDD device has not been met, transmits FDD data packets to FDD device 140 on a reduced-interference frequency. The reduced-interference frequency may be selected from within FDD downlink frequency band 115 that includes first and second frequencies. The first frequency may be adjacent to TDD transmission frequency band 110 (i.e., may be equal to a frequency at an edge of the TDD band 110), and the reduced-interference frequency may be closer to the second frequency than the first frequency. In other words, the reduced-interference frequency may be from within the half of FDD band 115 which is farther away from channel border 160 of TDD band 110 and FDD band 115. Such selection of reduced-interference frequency may ensure that FDD device 140 is away from severe interfering power of TDD device 135 operating on an interfering frequency from TDD band 110. Moreover, if FDD device 140 is operational with an application with a strict data-quality requirement, including a Quality of Service (QoS) requirement, FDD device 140 may not afford to wait for the next available interference-free time interval for transmission and, in such cases, FDD device 140 may be configured to transmit on a reduced-interference frequency with no guarantee of availability of an interference-free time interval. The application with a QoS requirement may include an application with a delay constraint (e.g., a Voice over IP (VoIP) application), an application with a minimum data rate constraint (e.g., a video streaming application), or an application with a minimum jitter constraint (e.g., a real-time multimedia application).

Additionally, or as an alternative, configuration-adjustment module 230 may perform other adjustments or modification in the operation of apparatus 200 to address any interference issue. For example, configuration adjustment module may increase DL transmission power level, change modulation and/or channel coding scheme, switch Multiple Input Multiple Output (MIMO) mode for higher diversity, etc.

Furthermore, in general, the number of FDD devices 140 suffering from TDD interference is small compared to the total number of active FDD devices in a cell of the FDD network. Accordingly, the probability of the affected FDD devices 140 requiring higher DL capacity than the DL capacity offered in the interference-free interval (e.g., three out of every five subframes, as shown in and described with respect to FIG. 4), is relatively small. Thus, the interference mitigation technique described above may not impose adverse constraints on the DL throughput of FDD device 140 under TDD interference. Also, it may be noted that, for the frame structure depicted in and described for FIG. 4, the maximum gap between two interference-free time intervals is 2 ms (e.g., for the TDD WiMAX default operating mode (29,18)), and it is known that the tightest FDD LTE packet delay budget is 50 ms for standardized QoS class identifiers 4. Therefore, for the system and techniques described herein, it may be reasonable to assume that most FDD devices may wait for a time interval corresponding to a few subframes, so that the DL transmission for the FDD device may be scheduled in an interference-free time interval (with or without reduced-interference frequency), and also meet the packet delay (and other data-quality) requirements.

Turning now to FIG. 6, the exemplary flowchart of process 600 illustrates a generalized embodiment of the interference detection technique, e.g., as carried out by apparatus 200 described above. Process 600 is described below with regard to interference scenario 1 (as shown in FIG. 1), where the reception at FDD (e.g., LTE) device 140 may be affected by interference from TDD (e.g., WiMAX) device 135. However, it should be understood that process 600 may be equally applicable for other interference scenarios, such as scenarios 2-4 as depicted in FIG. 1. Furthermore, process 600 may be applicable not only for interference cases between TDD and FDD networks (each of which may be operating as an LTE or WiMAX system), but also for interference detection in systems including two or more wireless networks all operating on a same "duplex" technology, e.g., all networks either supporting TDD or FDD.

At step 605, it may be determined, e.g., by operation-monitoring module 235, whether a triggering event in the FDD network has occurred, which may be an indicator to initiate interference detection, e.g., at FDD BS 130. The event may include a service disruption event between FDD BS 130 (or transceiver 215) and FDD device 140, e.g., occurring for a particular continuous time period. If the occurrence of the triggering event has been confirmed, processing of the quality-indicator (e.g., CQI) reports received from FDD device 140 at FDD BS 130 (or specifically, at transceiver 215) for interference detection may be carried out using more than one technique. Accordingly, a particular processing technique may be selected, at step 610, based on a determination (made, e.g., by operation-monitoring module 235) whether an FDD DL rate is less than a load threshold. As discussed above, the load threshold may be calculated based on, among other factors, a TDD DL rate (e.g., equal to the TDD DL rate or a certain percentage of the FDD DL rate).

If the response is "N" (i.e., label 611) at step 610, indicating that FDD DL rate is greater than the load threshold, a detailed interference detection technique including processing of the quality-indicator (CQI) reports by channel-quality module 245 may be initiated. For example, at step 615, FDD BS 130 may configure FDD device 140 such that FDD device 140 periodically provides the CQI reports with the period selected such that the CQI reports are received at FDD BS 130 more frequently than before the start of the interference detection. For example, the period of CQI reporting may be selected as 2 ms, which, considering the FDD (LTE) frame structure of 10 ms as shown in FIGS. 2 and 3, will correspond to five CQI reports per FDD frame. Also, at step 615, the number of FDD frames for which the CQI reports are needed at FDD BS 130, $N_{reqd\_frame}$ may be pre-configured, and the number of frames for which the CQI reports are already received, $N_{monitored\_frame}$ and a correlation value, $\beta$, both may be initialized equal to zero. In some embodiments, before executing step 615, it may be determined (e.g., by operation-monitoring module 235) whether or not a transmission power of FDD device 140 is greater than a transmission power threshold. Step 615 may be executed if the power of FDD device 140 is greater than the power threshold.

At step 620, it is determined if $N_{monitored\_frame} < N_{reqd\_frame}$. If the response 622 is "Y," the CQI reports may be processed by channel-quality module 245 to determine an actual quality-indicator report pattern for a set of periodically-received quality-indicator reports, and map every five CQI reports (corresponding to one FDD frame) in a binary format in a vector. For example, the CQI reports are mapped to "1" and "−1," as discussed above. Additionally, an expected quality-indicator report pattern may be determined (e.g., by channel-quality module 245) based on a frame configuration of TDD frames. The TDD frame configuration may be known at FDD BS 130, and stored as a frame-structure parameter, e.g., in memory 220.

At step 630, the actual quality-indicator report pattern may be correlated with the expected quality-indicator report pattern to determine the correlation value, $\beta$ and $N_{monitored\_frame}$ is increased by one. The process then loops back to step 620 to further process any additional CQI reports for other remaining FDD frames.

If the response of step 620 is "N" (label 621), the final correlation value, $\beta$ from step 630 is averaged over the total number of frames, $N_{reqd\_frame}$ and, at step 635, it is checked if the average correlation value is greater than a threshold, $\lambda$. If the response is "Y" (label 637), at step 643, FDD device 140 is determined as a victim of interference from TDD device 135, and at step 655, this device is placed in a list (e.g., maintained by and stored in FDD BS 130) of FDD device 140 affected by TDD device interference. However, if the response is "N" (label 636), at step 640, it is determined that the CQI degradation (and/or service disruption at step 605) is not caused by TDD device 135.

Referring to step 610, if the response is "Y" (label 612), a simpler processing of CQI reports is carried out by, e.g., channel-quality module 245. For example, at step 645, an interference-free time interval may be determined based on the frame configuration of TDD frames. As discussed above, the interference-free time interval may correspond to DL time interval of TDD frames, and FDD device 140 may be scheduled to receive FDD data packets from FDD BS 130 during the interference-free time interval. At step 650, it may be determined whether the reception quality at FDD device 140 for data packets received during the interference-free time interval has met (or exceeded) an acceptable-interference criterion (or threshold). If the response is "N" (i.e., label 651), at step 640, it is determined that degradation or interference at FDD device 140 is not caused by TDD device 135. However, if the response is "Y" (i.e., label 652), FDD device 140 may be directly placed in the list at step 655.

Referring to FIG. 7, exemplary flowchart of process 700 illustrates a generalized embodiment of the interference mitigation technique, e.g., as carried out by apparatus 200 described above. For interference mitigation, process 700 may be operated on results obtained from process 600, or may be executed completely independent of process 600. At step 705, it may be determined if the number of FDD devices 140 affected by TDD interference is greater than zero, or in other words, if the list of step 655 is not empty. If the response is "N" (label 706), FDD device 140 may continue to operate without any configuration modifications. However, if the response is "Y" (label 707), a downlink configuration of FDD BS 130 may be adjusted such that FDD BS 130 (or transceiver 215) transmits FDD data packets to FDD device 140 only during the interference-free time interval determined, e.g., based on TDD frame structure. At step 710, it may be determined if the current FDD subframe is in the interference-free time interval. If the response is "Y" (label 712), FDD frequency resources may be first allocated to FDD devices 140 under interference, and the remaining frequency resources may then be allocated to other FDD devices which are not under TDD interference. However, if the response is "N" (label 711), the downlink configuration of FDD BS 130 may be modified or adjusted, responsive to a determination that a data-quality requirement (e.g., a QoS requirement) of FDD device 140 has not been met, such that FDD BS 130 transmits FDD data packets to FDD device 140 on a reduced-interference frequency selected from within an FDD downlink frequency band. The reduced-interference frequency may be selected farther away from channel border 160 of TDD band 110 and FDD band 115.

Scenario 2: FDD UE to TDD MS Interference Case

Referring to FIG. 1, which depicts interference scenario 2 involving interference from FDD LTE device 142 to TDD WiMAX device 137, FDD UL band 120 in this scenario is adjacent to TDD band 112 such that the two bands share a set of one or more common frequencies which may be denoted as channel border frequencies. In some embodiments, TDD band 110 and TDD band 112 are not the same bands, such that one TDD band is adjacent to both FDD DL band 115 and FDD UL band 120. Accordingly, interference from FDD device 142 to TDD device 137 may not be reciprocal in nature to the interference from TDD device 135 to FDD device 140, and therefore, techniques discussed above for scenario 1 may not be applicable for scenario 2.

In some embodiments, for determining interference in scenario 2, parameter-monitoring module 230 may be configured to monitor an operational parameter of interfering FDD device 142, and determine whether the monitored parameter is within a fixed range of a maximum value of the operational parameter to confirm FDD-TDD device interference. In some embodiments, the operational parameter includes a transmit power level at which FDD device 142 is transmitting FDD data packets or frames to FDD BS 132. For example, if FDD device 142 has a maximum power level equal to about 23 dBm, a fixed range for monitoring purposes may include power values, e.g., from 13 dBm to 23 dBm or may be a smaller range. However, the link budget and overall cell coverage for FDD BS 132 may be reduced if the range includes power level values too far from the maximum value. In other words, the fixed range may be so chosen such that the parameter monitoring involving the fixed range provides enough protection to nearby TDD mobile devices so as not to unnecessarily sacrifice the link budget. To have an exact value of a power threshold, instead of a fixed range for interference detection, may require, among other things, study of RF characteristics of both FDD 142 and TDD 137 devices, FDD and TDD network deployment details, and mobile subscriber geographical distribution. In other words, the fixed power range or power threshold may be implemented as a configurable parameter, and be fine-tuned during the deployment based on the above-mentioned network characteristics.

Accordingly, if it is determined that FDD device 142 is causing interference to TDD device 137, configuration-adjustment module 230 may configure transceiver 215 such that transceiver 215 receives FDD data packets from FDD device 142 on a reduced-interference frequency selected from within FDD UL band 120. The reduced-interference frequency may be selected such that it is either the frequency at the center of the FDD UL band 120, or is from within the half of FDD band 120 which is farther away from channel border 160 of bands 112 and 120. Additionally, or as an alternative, if FDD BS 132 has knowledge of a TDD frame structure including TDD DL time interval (as described earlier), transceiver 215 and/or FDD device 142 may be configured such that device 142 does not transmit data packets to transceiver 215 during the TDD downlink time interval.

Generalization for TDD UE-FDD UE and TDD UE-TDD UE Interference

While the system and techniques in this disclosure are described for interference scenarios between TDD devices (e.g., WiMAX MS) and FDD devices (e.g., LTE UE), the above-discussed interference determination and mitigation techniques may be generalized to apply for scenario related to interference between TDD-LTE and FDD-LTE devices (i.e., both the interfering and affected wireless devices are operating on LTE networks, albeit on TDD and FDD schemes, respectively). Accordingly, instead of using TDD WiMAX frame structure 410 shown in FIG. 4, the frame structure and other configurations of an LTE frame may be used for determining various operational parameters (e.g., interference-free time interval). An exemplary TDD-LTE frame structure 800 is shown in FIG. 8, and Table 3 enumerates TDD-LTE uplink-downlink configurations. In this case, the frame structures for FDD LTE and TDD LTE each including 1 ms subframes are synchronized as discussed above. FDD device 140 that is experiencing interference may therefore be affected with similar interference patterns as from TDD WiMAX device 135, and thus, similar interference-free time intervals may be determined, e.g., by clean-slot module 252 for adjustment of configuration at FDD LTE BS 130. The interference pattern from TDD-LTE UE to FDD-LTE UE may be derived from TDD-LTE frame structure and uplink-downlink configurations. As depicted in FIG. 8, the "S" subframe consists of symbols for downlink, gap and uplink operation. The number of symbols allocated to downlink, gap and uplink operation for each of various "S" subframe configurations is specified in 3GPP LTE standard, as enumerated in Table 4 below. Accordingly, the exact DL-UL duty cycle (and therefore, interference pattern) of TDD-LTE may be calculated for any combination of uplink-downlink configuration and "S" subframe configuration.

TABLE 3

LTE-TDD uplink-downlink configurations

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

TABLE 4

LTE-TDD "S" subframe configurations

| "S" frame configuration | Number of OFDM symbols | | |
|---|---|---|---|
| | DwPTS | Gap | UpPTS |
| 0 | 3  | 10 | 1 |
| 1 | 9  | 4  | 1 |
| 2 | 10 | 3  | 1 |
| 3 | 11 | 2  | 1 |
| 4 | 12 | 1  | 1 |
| 5 | 3  | 9  | 2 |
| 6 | 9  | 3  | 2 |
| 7 | 10 | 2  | 2 |
| 8 | 11 | 1  | 2 |

In some embodiments, even if network operators of adjoining networks select same frame configuration for their respective networks, e.g., same LTE-TDD uplink-downlink configuration for adjoining TDD networks, and the networks are synchronized to the same common clock or timing source, selection of different "S" subframe configuration for the networks may result in device-to-device (or MS-to-MS) interference. For example, as illustrated in FIG. 10, network 1 may include BS 1010 communicating with user equipment (UE) or mobile station (MS) 1020 with "S" subframe configuration 3 (from Table 4 above). Additionally, a co-located network 2 may include BS 1030 communicating with UE or MS 1040 with "S" subframe configuration 7 (from Table 4 above). In this scenario including two co-located UEs (i.e., UE 1020 and UE 1040), interference may occur if a period corresponding to DwPTS symbols (e.g., period 1060) of one UE (e.g., UE 1020) overlaps with a period corresponding to UpPTS symbols (e.g., period 1080) of another UE (e.g., UE 1040). Such interference may result because a UE starting transmission on its uplink (i.e., transmission to its associated BS) before the other co-located UE has finished reception of its downlink (i.e., transmission from its associated BS). For example, potentially, such interference due to different "S" subframe configuration may occur if a network using "S" subframe configuration 5, 6, 7 or 8 is in proximity to a network using "S" subframe configuration 4, or "S" subframe configuration 2 or 3. The latter possibilities may depend on the difference in UpPTS "timing advance" in effect, i.e., if the timing advance (e.g., starting uplink transmission in the Gap period of the "S" subframe) is more than one symbol in duration. In general, if network operators choose incompatible "S" frame formats or if they choose conflicting frame configurations, then periods of transmit and receive may overlap at the UEs of the two networks, causing interference and associated desensitization, and possibly blocking of the affected receiver. Also, to address interference on the BS of the affected UE, guard bands may used to enable filters to be designed to provide enough protection to and from neighboring networks.

Furthermore, in some embodiments, the above-discussed interference detection and mitigation techniques are applicable for wireless system involving interference between two TDD wireless devices each operating with a different TDD (LTE or WiMAX) network. For example, instead of operating on FDD scheme, devices 140, 142 and base stations 130, 132 may be operating on TDD scheme with corresponding TDD frequency bands, such that interference is caused between TDD device 135 and TDD device 140, and between TDD device 137 and TDD device 142. FIG. 9 illustrates frame configurations and interference patterns for two LTE TDD modes each associated with a different TDD network having different frame configurations (e.g., chosen from Table 3). For example, as shown, TDD frame 910 associated with a first TDD network has a total duration of 10 ms with 10 subframes each of duration 1 ms. TDD frames 920 each associated with a second TDD network has a total duration of 5 ms with 5 subframes each of duration 1 ms. Accordingly, two TDD frame 920 are shown in conjunction with one TDD frame 910. In accordance with such TDD frame configurations, when a first TDD device (configured to exchange data packets using TDD frame configuration 910) and a second TDD device (configured to exchange data packets using TDD frame configuration 920) are in close proximity, interference may occur when one of the first and second TDD devices is performing the uplink operation, and the other device is performing the downlink operation. Such interference cases are illustrated as unprotected (or interference) zones 930. For example, unprotected zone 931 (spanning subframe 4) depicts the first TDD device as being engaged with the uplink operation and the second TDD device as being engaged with the downlink operation. Similarly, unprotected zone 932 (spanning subframes 7 and 8) depicts the first TDD device as being engaged with the downlink operation and the second TDD device as being engaged with the uplink operation. However, when both the first and second TDD devices are either under uplink or downlink operation, the associated subframes may be identified as interference-free zone(s) 940 (as also shown in and described with regard to FIG. 4). The interference-free zones (or time intervals) may be used by the affected or interfering TDD base station for interference detection and mitigation as described in sections above (and illustrated in corresponding figures) including discussions of scenario 1 and scenario 2 interference cases. Also, in such interference scenarios, TDD frames of the interfering TDD system and of the affected TDD system may not be synchronized or aligned unlike as shown in and described for FIG. 4 with regard to TDD-FDD device interference.

In some embodiments, a determination or confirmation (e.g., by channel-quality module 245 based on received quality-indicator reports, as discussed above) that the first TDD device (e.g., TDD device 135) operational with the first base station (e.g., TDD BS 125) is experiencing interference by the second TDD device (e.g., TDD device 140) operational with the second TDD base station (e.g., TDD BS 130) may indicate, or may be used as a basis to indicate, that the first TDD device will also cause interference to the second TDD device. Such assumption of the first TDD device possibly causing interference to the second TDD device, is based on the fact that because in TDD systems the downlink and uplink operate on the same frequency, if a base station detects its associated TDD device is experiencing interference, then it is very likely it is also causing (or will cause) interference to another TDD device. In such interference scenario, it is assumed that both TDD networks are conducting two-way communications.

To address or mitigate possible interference from a first TDD device 135 (that is itself presently experiencing interference), configuration-adjustment module 230 may adjust an uplink configuration (i.e., transmission from TDD device 135 to TDD BS 125) of transceiver 215. For example, configuration-adjustment module 230 may configure transceiver 215 such that transceiver 215 receives TDD data packets from the first TDD device 135 during an "interference-free" time interval. This configuration of transceiver 215 may be considered a protective operation as it could be the degradation at first TDD device 135 is due to other devices' transmissions which they are close in proximity to first TDD device 135. In some embodiments, clean-slot module 252 is configured to determine the interference-free time interval based on frame configurations of first TDD BS 125 and second TDD BS 130. For example, as shown in and discussed above with respect to FIG. 9, the interference-free time interval (or zone) may be related to (e.g., completely or partially overlap) time intervals when both the first and second TDD devices 135, 140 are either under uplink or downlink operation, in accordance with their respective frame configuration. For example, considering the TDD frame configurations enumerated in Table 3 above, it can be observed that irrespective of the frame configuration chosen for a network, subframes 0, 1, 2, 5 and the first part of subframe 6 are always in the same mode of operation (i.e., D, U, or S). In the case of both (co-located) networks using a 5 ms switch-point periodicity, all of subframe 6 and subframe 7 are also in the same mode of operation. In the case of both networks using a 10 ms switch-point periodicity, subframes 6 to 9 are also in the same mode of operation. Accordingly, if frame-start timing of frames of both networks is time synchronized (e.g., using a common time reference source such as a GPS or a device operating in accordance with the IEEE 1588 standard), it may be assumed that TDD devices (e.g., TDD devices 135, 140) would not experience interference from each other while operating in subframes configured for the same type of operation in accordance with the chosen frame configuration. As such, subframes of a frame related to one TDD network having the same type of operation as in subframes of a frame related to another co-located network may be considered as "interference-free" time interval.

In some embodiments, TDD devices that are operating at high transmit powers (e.g., transmit powers higher than a pre-determined threshold) could be scheduled in the interference-free time interval. Such scheduling adjustment may be considered as a preventative move as these TDD devices may be cell-edge users, and hence likely have their downlink operating close to sensitivity. As such, those TDD devices may be more susceptible to degradation due to other TDD devices transmitting at the same time. Those TDD devices may also have limited transmit power budget, so may not be able to raise their transmit power to counter any desensitization that may occur in unprotected subframes at the associated TDD BS.

In some embodiments, clean-slot module 252 is configured to determine an "unprotected" time interval based on a frame configuration associated with first TDD BS 125 and a frame configuration associated with second TDD BS 140. For example, in contrast to the determination of the interference-free time interval, clean-slot module 252 may determine an unprotected time interval including a time interval spanning subframes (associated with different TDD base stations or networks) with different operations (e.g., uplink vs. downlink) performed therein. In some embodiments, configuration-adjustment module 230 adjusts an uplink configuration of first TDD BS 125 such that first TDD BS 125 does not receive TDD data packets from first TDD device 135 during the unprotected time interval.

In some embodiments, an operational frequency band associated with at least one of first TDD device 135 and second TDD device 140 includes a first portion or set of frequencies, and a second portion or set of frequencies. The first portion of the frequency band may include one or more frequencies on which the reception at first TDD device 135 experiences interference from second TDD device 140. In some embodiments, the quality-indicator reports from TDD device 135 include information to identify the first portion of the frequency band. Alternatively, the first portion of the frequency band may be known a priori, e.g., design of network including TDD BS 130 and TDD device 140. In some embodiments, configuration-adjustment module 230 is configured to adjust the uplink configuration of first TDD BS 125 such that first TDD BS 125 receives TDD data packets from first TDD device 135 using a frequency from the second portion of the frequency band, wherein the second portion may include one or more frequencies on which first TDD device 135 does not experience interference, e.g., from TDD device 140 or any other TDD device. As such, the first and second portions may (or may not) be mutually exclusive.

In some embodiments, the frame structures or configurations of TDD frames may be exchanged as a priori information between TDD BS 125, 130 directly or via a network management system. Alternatively, TDD BS 125 may be configured to analyze and determine the TDD frame structure or configuration associated with TDD BS 130, and vice-versa. The TDD frame structures may remain unchanged over a long period of time, e.g., a period corresponding to duration of several TDD frames, or in general, for several hours or even days.

In some embodiments, TDD BS (e.g., TDD BS 125) or configuration-adjustment module 230 within the TDD BS may perform one or more operations when scheduling an associated TDD device 135 for uplink transmission in an unprotected zone in order to limit the impact of TDD device-TDD device interference (if the operators can agree or regulations choose to enforce). For example, stricter emissions limits on the TDD device may be imposed through the form of A-MPR, e.g., using fractional pathloss compensation-based power control, user-specific closed-loop power control commands, or other power control mechanisms. Alternatively, or additionally, artificial internal guard bands may be used by not using the outermost subcarriers (or resource blocks), and using PUCCH over-provisioning and blanking in combination with this.

In some embodiments, TDD BS (e.g., TDD BS 125) or configuration-adjustment module 230 within the TDD BS may perform one or more operations when scheduling downlink transmissions in an unprotected zone in order to limit the impact of BS-BS interference (e.g., between TDD BS 125 and TDD BS 130). For example, the power on outermost subcarriers may be reduced, artificial internal guard bands may be used by not using the outermost subcarriers (or resource blocks). The TDD BS may use algorithms such as interference reject combining in the UL receiver in order to reduce the impact of any BS-BS interference.

Further, the above processes may be implemented as computer instructions embodied on a physical, tangible computer-readable medium which, when executed by a processor in or associated with FDD and TDD base stations 125, 127, 130, 132, or in devices 135, 137, 140, 142, carries out the functionality of the embodiments described above.

In addition, over-the-air provisioning of software updates and/or data updates from a base station to a wireless device may be made along the lines of the embodiments discussed above.

Those with skill in the art will appreciate that the inventive concept described herein may work with various system configurations. In addition, various embodiments of this disclosure may be made in hardware, firmware, software, or any suitable combination thereof. As discussed above, various aspects of this disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience, and that such actions in fact result from computing devices, processors, controllers, or other devices executing the firmware, software, routines, or instructions.

Various embodiments may be described herein as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

What is claimed is:

1. A method of detecting and mitigating interference between a first wireless time division duplex (TDD) communications device operational with a first TDD base station and a second TDD device operational with a second TDD base station, the method comprising:
    processing, using a processor operatively associated with the first TDD base station, quality-indicator reports received from the first TDD device indicating a reception quality of one or more TDD data packets at the first TDD device, wherein the processing indicates whether the reception at the first TDD device has experienced interference from the second TDD device on a frequency in a first portion of a frequency band associated with the first TDD base station; and
    responsive to a determination that the reception at the first TDD device has experienced interference from the second TDD device, adjusting, using the processor, an uplink configuration of the first TDD base station such that the first TDD base station receives TDD data packets from the first TDD device using a frequency from a second portion of the frequency band different from the first portion to mitigate interference caused by the first TDD device to the second TDD device.

2. The method of claim 1, wherein a determination of interference caused by the first TDD device to the second TDD device is based on the determination that the reception at the first TDD device has experienced interference from the second TDD device.

3. The method of claim 2, wherein a frame start timing associated with the first TDD base station is synchronized with a frame start timing associated with the second TDD base station.

4. The method of claim 3, wherein the frame start timings of the first TDD base station and the second TDD base station is based on a common time reference source,
    wherein the common time reference source comprises a Global Positioning System (GPS) or a device configured to operate in accordance with the IEEE 1588 standard.

5. The method of claim 3, wherein the first TDD base station and the second TDD base station are associated with different frame configurations.

6. The method of claim 1, further comprising, adjusting, using the processor, a downlink configuration of the first TDD base station to mitigate interference from the second TDD device, responsive to a determination that the reception at the first TDD device has experienced interference from the second TDD device.

7. The method of claim 1, further comprising determining an interference-free time interval based on a frame configuration associated with the first TDD base station and a frame configuration associated with the second TDD base station,
    wherein said adjusting the uplink configuration of the first TDD base station is based on the interference-free time interval.

8. The method of claim 7, wherein said adjusting the uplink configuration of the first TDD base station comprises configuring an uplink operation of the first TDD base station such that the first TDD base station receives TDD data packets from the first TDD device during the interference-free time interval.

9. The method of claim 1, further comprising determining an unprotected time interval based on a frame configuration associated with the first TDD base station and a frame configuration associated with the second TDD base station,
    wherein said adjusting the uplink configuration of the first TDD base station is based on the unprotected time interval.

10. The method of claim 9, wherein said adjusting the uplink configuration of the first TDD base station comprises configuring an uplink operation of the first TDD base station such that the first TDD base station does not receive TDD data packets from the first TDD device during the unprotected time interval.

11. The method of claim 1, wherein at least one of the first TDD base station or the second TDD base station comprises a WiMAX base station, and at least one of the first TDD device or the second TDD device comprises a WiMAX device.

12. The method of claim 1, wherein at least one of the first TDD base station or the second TDD base station comprises an LTE base station, and at least one of the first TDD device or the second TDD device comprises an LTE device.

13. The method of claim 1, further comprising periodically receiving the quality-indicator reports from the first TDD device, wherein a period of receiving the quality-indicator reports is selectable, and
    wherein said processing the quality-indicator reports comprises determining an actual quality-indicator report pattern for a set of periodically-received quality-indicator reports, the actual quality-indicator report pattern indicating whether the reception at the first TDD device has experienced interference from the second TDD device.

14. The method of claim 13, further comprising:
- determining, using the processor, an expected quality-indicator report pattern based on a frame configuration associated with the first TDD base station and a frame configuration associated with the second TDD base station; and
- correlating, using the processor, the actual quality-indicator report pattern with the expected quality-indicator report pattern to determine whether the reception at the first TDD device has experienced interference from the second TDD device.

15. The method of claim 14, wherein said correlating comprises:
- calculating a correlation value representing a correlation between the expected quality-indicator report pattern and the actual quality-indicator report pattern; and
- comparing the calculated correlation value with a predetermined threshold value to determine whether the reception at the first TDD device has experienced interference from the second TDD device.

16. An apparatus capable of operating in a wireless network, and detecting and mitigating interference between a first time division duplex (TDD) communications device and a second TDD device, the apparatus comprising:
- a transceiver configured to exchange TDD data packets with the first TDD device;
- a memory device configured to store quality-indicator reports indicating a reception quality of one or more TDD data packets received at the first TDD device;
- a channel-quality module configured to process the quality-indicator reports, wherein the processing of the quality-indicator reports indicate whether the first TDD device has experienced interference from the second TDD device on a frequency in a first portion of a frequency band associated with the transceiver; and
- a configuration-adjustment module configured to adjust an uplink configuration of the transceiver such that the transceiver receives TDD data packets from the first TDD device using a frequency from a second portion of the frequency band different from the first portion to mitigate interference caused by the first TDD device to the second TDD device, responsive to a determination that the first TDD device has experienced interference from the second TDD device.

17. The apparatus of claim 16, wherein a determination of interference caused by the first TDD device to the second TDD device is based on the determination that the reception at the first TDD device has experienced interference from the second TDD device.

18. The apparatus of claim 17, wherein a frame start timing associated with the first TDD base station is synchronized with a frame start timing associated with the second TDD base station.

19. The apparatus of claim 18, wherein the frame start timings of the first TDD base station and the second TDD base station is based on a common time reference source, wherein the common time reference source comprises a Global Positioning System (GPS) or a device configured to operate in accordance with the IEEE 1588 standard.

20. The apparatus of claim 19, wherein the first TDD base station and the second TDD base station are associated with different frame configurations.

21. The apparatus of claim 16, wherein the configuration-adjustment module is further configured to adjust a downlink configuration of the first TDD base station to mitigate interference from the second TDD device, responsive to a determination that the reception at the first TDD device has experienced interference from the second TDD device.

22. The apparatus of claim 16, further comprising a clean-slot module to determine an interference-free time interval based on a frame configuration associated with the first TDD base station and a frame configuration associated with the second TDD base station,
- wherein the configuration-adjustment module is configured to adjust the uplink configuration of the first TDD base station based on the interference-free time interval.

23. The apparatus of claim 22, wherein the configuration-adjustment module, to adjust the uplink configuration of the first TDD base station, is adapted to configure an uplink operation of the first TDD base station such that the first TDD base station receives TDD data packets from the first TDD device during the interference-free time interval.

24. The apparatus of claim 16, further comprising a clean-slot module to determine an unprotected time interval based on a frame configuration associated with the first TDD base station and a frame configuration associated with the second TDD base station,
- wherein the configuration-adjustment module is configured to adjust the uplink configuration of the first TDD base station based on the unprotected time interval.

25. The apparatus of claim 24, wherein the configuration-adjustment module, to adjust the uplink configuration of the first TDD base station, is adapted to configure an uplink operation of the first TDD base station such that the first TDD base station does not receive TDD data packets from the first TDD device during the unprotected time interval.

26. A non-transitory computer-readable medium comprising computer-readable instructions physically embodied thereon which, when executed by a processor associated within a base station capable of operating in wireless network, cause the processor to carry out the functions of detecting and mitigating interference between a first wireless time division duplex (TDD) communications device operational with a first TDD base station and a second TDD device operational with a second TDD base station, the functions comprising:
- processing quality-indicator reports received from the first TDD device indicating a reception quality of one or more TDD data packets at the first TDD device, wherein the processing indicates whether the reception at the first TDD device has experienced interference from the second TDD device on a frequency in a first portion of a frequency band associated with the first TDD base station; and
- responsive to a determination that the reception at the first TDD device has experienced interference from the second TDD device, adjusting, using the processor, an uplink configuration of the first TDD base station such that the first TDD base station receives TDD data packets from the first TDD device using a frequency from a second portion of the frequency band different from the first portion to mitigate interference caused by the first TDD device to the second TDD device.

27. The method of claim 1, wherein the quality-indicator reports include information to identify the first portion of the frequency band.

28. The non-transitory computer-readable medium of claim 26, wherein the functions further comprise determining an interference-free time interval based on a frame configuration associated with the first TDD base station and a frame configuration associated with the second TDD base station,
- wherein said adjusting the uplink configuration of the first TDD base station is based on the interference-free time interval.

* * * * *